United States Patent
Khosla et al.

(10) Patent No.: US 8,396,730 B2
(45) Date of Patent: Mar. 12, 2013

(54) SYSTEM AND METHOD FOR RESOURCE ALLOCATION AND MANAGEMENT

(75) Inventors: Deepak Khosla, Camarillo, CA (US); Eric Huang, San Francisco, CA (US); David L. Ii, Manassa, VA (US)

(73) Assignee: Raytheon Company, Waltham, MA (US)

( * ) Notice: Subject to any disclaimer, the term of this patent is extended or adjusted under 35 U.S.C. 154(b) by 97 days.

(21) Appl. No.: 13/069,638

(22) Filed: Mar. 23, 2011

(65) Prior Publication Data

US 2012/0209652 A1      Aug. 16, 2012

Related U.S. Application Data

(60) Provisional application No. 61/442,481, filed on Feb. 14, 2011.

(51) Int. Cl.
*G06Q 10/00*    (2012.01)

(52) U.S. Cl. .......... 705/7.11; 706/905; 706/913

(58) Field of Classification Search .......... None
See application file for complete search history.

(56) References Cited

U.S. PATENT DOCUMENTS

| | | | |
|---|---|---|---|
| 6,259,988 B1 * | 7/2001 | Galkowski et al. | 701/533 |
| 6,497,169 B1 * | 12/2002 | Khosla | 89/1.11 |
| 6,704,692 B1 * | 3/2004 | Banerjee et al. | 702/189 |
| 6,910,657 B2 * | 6/2005 | Schneider | 244/3.11 |
| 6,934,615 B2 * | 8/2005 | Flann et al. | 701/50 |
| 7,047,861 B2 | 5/2006 | Solomon | |
| 7,162,199 B1 * | 1/2007 | Glickstein et al. | 455/3.02 |
| 7,236,861 B2 | 6/2007 | Paradis et al. | |
| 7,248,952 B2 * | 7/2007 | Ma et al. | 701/25 |
| 7,447,593 B2 * | 11/2008 | Estkowski et al. | 701/301 |
| 7,451,023 B2 | 11/2008 | Appleby et al. | |
| 7,603,212 B2 * | 10/2009 | Ariyur et al. | 701/23 |
| 7,606,659 B2 * | 10/2009 | Erignac | 701/455 |
| 7,757,595 B2 * | 7/2010 | Khosla et al. | 89/1.11 |
| 7,769,491 B2 * | 8/2010 | Fukuchi et al. | 700/253 |
| 8,013,781 B2 * | 9/2011 | Stockmann | 342/93 |
| 8,186,589 B2 * | 5/2012 | Ben Asher et al. | 235/411 |
| 8,199,643 B2 * | 6/2012 | Hirsch et al. | 370/230 |
| 8,244,469 B2 * | 8/2012 | Cheung et al. | 701/519 |
| 2004/0193349 A1 * | 9/2004 | Flann et al. | 701/50 |
| 2005/0216181 A1 * | 9/2005 | Estkowski et al. | 701/200 |
| 2006/0074557 A1 * | 4/2006 | Mulligan et al. | 701/213 |
| 2006/0085106 A1 * | 4/2006 | Gaudiano et al. | 701/23 |
| 2006/0200333 A1 * | 9/2006 | Dalal et al. | 703/17 |
| 2007/0021880 A1 * | 1/2007 | Appleby et al. | 701/23 |
| 2007/0162405 A1 * | 7/2007 | Parunak et al. | 706/12 |

(Continued)

OTHER PUBLICATIONS

Rasmussen SJ and Shima T (2006). Branch and Bound Tree Search for Assigning Cooperating UAVs to Multiple Tasks. Proceedings of the 2006 American Control Conference Minneapolis, Minnesota, USA, Jun. 14-16, 2006. 2171-2176.*

(Continued)

*Primary Examiner* — Bradley B Bayat
*Assistant Examiner* — Brett Feeney
(74) *Attorney, Agent, or Firm* — Renner, Otto, Boisselle & Sklar, LLP

(57) ABSTRACT

To improve the scheduling and tasking of resources, the present disclosure describes an improved planning system and method for the allocation and management of resources. The planning system uses a branch and bound approach of tasking resources using a heuristic to expedite arrival at a deterministic solution. For each possible functional mode of the resources, an upper bound is determined. The upper bounds are employed in an objective function for the branch and bound process to determine the functional mode in which to place the resources and to determine movement paths for the resources, all in an environment where a hostile force may attempt to destroy the resources.

20 Claims, 13 Drawing Sheets

U.S. PATENT DOCUMENTS

| | | | |
|---|---|---|---|
| 2007/0225912 A1* | 9/2007 | Grush | 701/213 |
| 2007/0244673 A1* | 10/2007 | Khosla et al. | 703/2 |
| 2007/0288132 A1 | 12/2007 | Lam | |
| 2007/0288156 A1* | 12/2007 | Neff et al. | 701/202 |
| 2008/0086236 A1* | 4/2008 | Saito et al. | 700/245 |
| 2008/0235318 A1* | 9/2008 | Khosla et al. | 709/201 |
| 2008/0250875 A1* | 10/2008 | Khosla et al. | 73/863 |
| 2009/0157233 A1* | 6/2009 | Kokkeby et al. | 701/3 |
| 2010/0017046 A1* | 1/2010 | Cheung et al. | 701/2 |
| 2010/0017115 A1* | 1/2010 | Gautama | 701/202 |
| 2010/0198514 A1* | 8/2010 | Miralles | 701/302 |
| 2010/0250319 A1* | 9/2010 | Khosla et al. | 705/8 |
| 2011/0004581 A1* | 1/2011 | Schmidt et al. | 706/55 |
| 2011/0029239 A1* | 2/2011 | Okude et al. | 701/211 |
| 2011/0040750 A1* | 2/2011 | Safra et al. | 707/723 |
| 2011/0046837 A1* | 2/2011 | Khosla et al. | 701/26 |

OTHER PUBLICATIONS

Reinefeld A and Marsland TA (1994). Enhanced Iterative-Deepening Search. IEEE Transactions on Pattern Analysis and Machine Intelligence. 16(7): 701-710.*

Undeger C and Polat F (2010). Multi-agent real-time pursuit. Auton Agent Multi-Agent Syst (2010) 21:69-107.*

Chung TH, Kress M and Royset JO (2009). Probabilistic Search Optimization and Mission Assignment for Heterogeneous Autonomous Agents. Robotics and Automation, 2009. ICRA '09. 939-945.*

Grundel DA (2005). Searching for a moving target: optimal path planning. Networking, Sensing and Control, 2005 IEEE. 867-872.*

Gualandi S and Tranchero B (2007). Concurrent constraint programming-based path planning for uninhabited air vehicles. Unattended/Unmanned Ground, Ocean, and Air Sensor Technologies and Applications VI. Edited by Carapezza, Edward M. Proceedings of the SPIE, vol. 5417, pp. 176-185.*

Shetty VK, Sudit M and Nagi R (2006). Priority-based assignment and routing of a fleet of unmanned combat aerial vehicles. Computers & Operations Research 35 1813-1828.*

Waharte S, Symington A and Trigoni N (2010). Probabilistic Search with Agile UAVs. IEEE International Conference on Robotics and Automation. May. 2840-2845.*

Onodera, H. et al., "Branch-and-Bound Placement for Building Block Layout", (1991), Design Automation Conference, 28th ACM/IEEE, pp. 433-439.

Fukunage, K. et al., "A Branch and Bound Algorithm for Computing K-Nearest Neighbors", (1975), IEE Transaction on Computers, vol. C-24, Issue 7, pp. 750-753.

Haffner, S. et al., "Brand and Bound Algorithm for Transmission System Expansion Planning Using a Transportation Model", (2000), Generation, Transmission and Distribution, IEEE Proceedings, vol. 147, Issue 3, pp. 149-156.

Chhetri, A.S. et al., "Nonmyopic Sensor Scheduling and its Efficient Implementation for Target Tracking Applications", EURASIP Journal on Applied Signal Processing vol. 2006, Article ID 31520, pp. 1-18.

Earl, M.G. et al., "A Decomposition Approach to Multi-Vehicle Cooperative Control", <http://arxiv.org/abs/cs.RO/0504081>, pp. 1-36.

Feng, Z.G. et al., "Branch and Bound Method for Sensor Scheduling in Discrete Time", (2005), Journal of Industrial and Management Optimization, vol. 1, pp. 499-512.

Kearns, Michael et al., "A Sparse Sampling Algorithm for Near-Optimal Planning in Large MDP's", Uncertainty and Probabilistic Reasoning, pp. 1324-1331.

Kocsis, Levente et al., "Bandit Based Monte-Carlo Planning", Computer and Automation Research Institute, Budapest, Hungary.

Bellingham, John Saunders, "Coordination and Control of UAV Fleets using Mixed-Integer Linear Programming", Massachusetts Institute of Technology, Sep. 2002, pp. 1-116.

Hohzaki et al., "Optimal strategy of route and look for the path constrained search problem with reward criterion", (1997), European Journal of Operational Research, pp. 236-249.

Eagle et al., "An optimal branch-and-bound procedure for the constrained path, moving target search problem", (1990), Operations Research, vol. 38, No. 1, pp. 110-114.

Jung et al., "Multiresolution on-line path planning for small unmanned aerial vehicles", (2008), American Control Conference.

Davidson et al., "A fast pruning algorithm for optimal sequence alignment", (2001), Proceedings of the 2nd IEEE International Symposium on Bioinformatics & Engineering.

Ignall et al., "Application of the branch and bound technique to some flow-shop scheduling problems", (1964), Contract No. NSF-GP 2729.

Laburthe et al., "SALSA: A language for search algorithms", (1998), pp. 310-324.

Pesant et al., "A view of local search in constraint programming", (1996), In Proceedings of CP '96, pp. 353-366.

Gaudiano et al., "Swarm intelligence: a new C2 paradigm with an application to control swarms of UAVs", (2003), 8th ICCRTS Command and Control Research and Technology Symposium.

Shiina, Takayuki, "Integer Programming model and exact solution for concentrator location problem", (2000), Journal of the Operations Research, Society of Japan, vol. 43, No. 2, pp. 291-305.

* cited by examiner

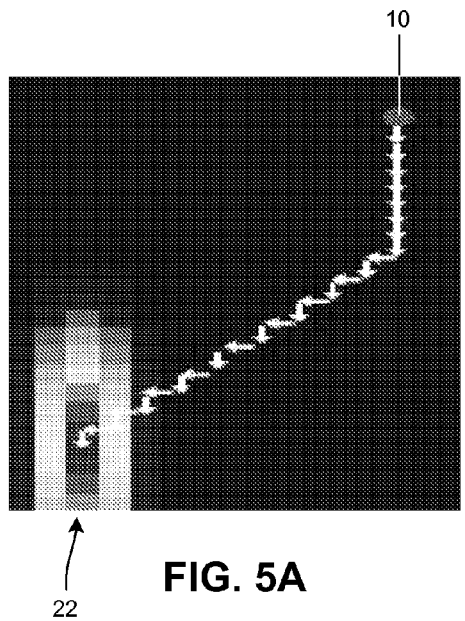
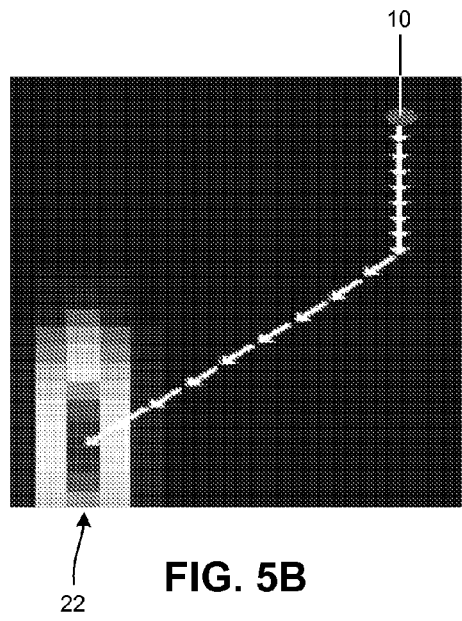
FIG. 5A          FIG. 5B
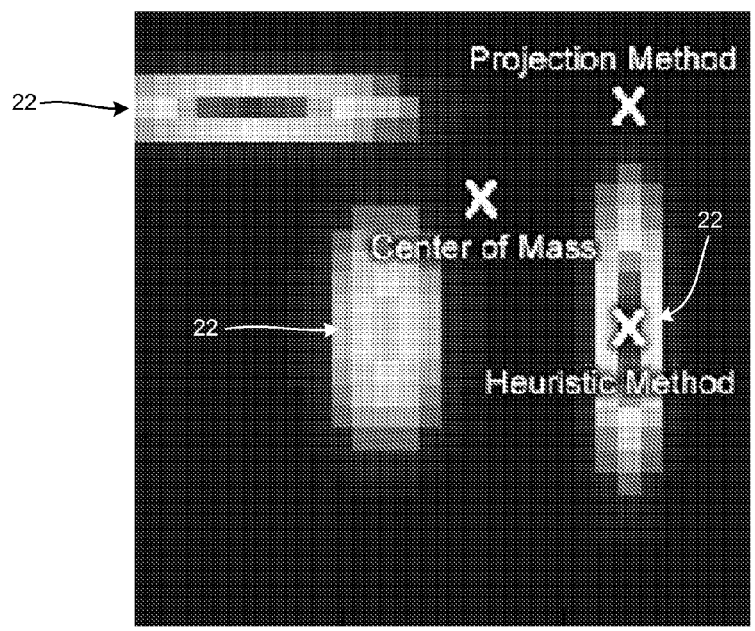
FIG. 6

SYSTEM AND METHOD FOR RESOURCE ALLOCATION AND MANAGEMENT

RELATED APPLICATION DATA

This application claims the benefit of U.S. Provisional Patent Application No. 61/442,481 filed Feb. 14, 2011, the disclosure of which is incorporated herein by reference in its entirety.

TECHNICAL FIELD OF THE INVENTION

The technology of the present disclosure relates generally to scheduling and tasking one or more unmanned mobile resources to optimize information collection and task completion.

BACKGROUND

One type of unmanned mobile resource is an unmanned aerial vehicle (UAV) that flies over an area of interest (AOI) to collect information. Scheduling and tasking UAVs to follow a flight pattern to optimize information collection is a complex combinatorial problem.

The problem becomes even more complex when there are plural resources to be controlled in coordination with one another in a hostile environment, and each resource has multiple operational capabilities which may be different than capabilities of other resources.

SUMMARY

To improve the scheduling and tasking of resources in a multi-mode environment, the present disclosure describes an improved planning system and method for the allocation and management of resources. In one embodiment, the planning system uses a branch and bound approach for tasking resources using a heuristic to expedite arrival at a deterministic solution. A hybrid branch and bound approach may be used where both local and global planning are employed in a hierarchical fashion. In addition, for each possible functional mode of the resources, an upper bound is determined. The upper bounds are employed in an objective function for the branch and bound process to determine the functional mode in which to place the resources and to determine movement paths for the resources, all in an environment where a hostile force may attempt to destroy the resources.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 5A is an exemplary flight path using cardinal directions;

FIG. 5B is an exemplary flight path using ordinal directions;

FIG. 6 shows representative endpoints for a global move determined using various techniques;

DETAILED DESCRIPTION OF EMBODIMENTS

Figure 1:
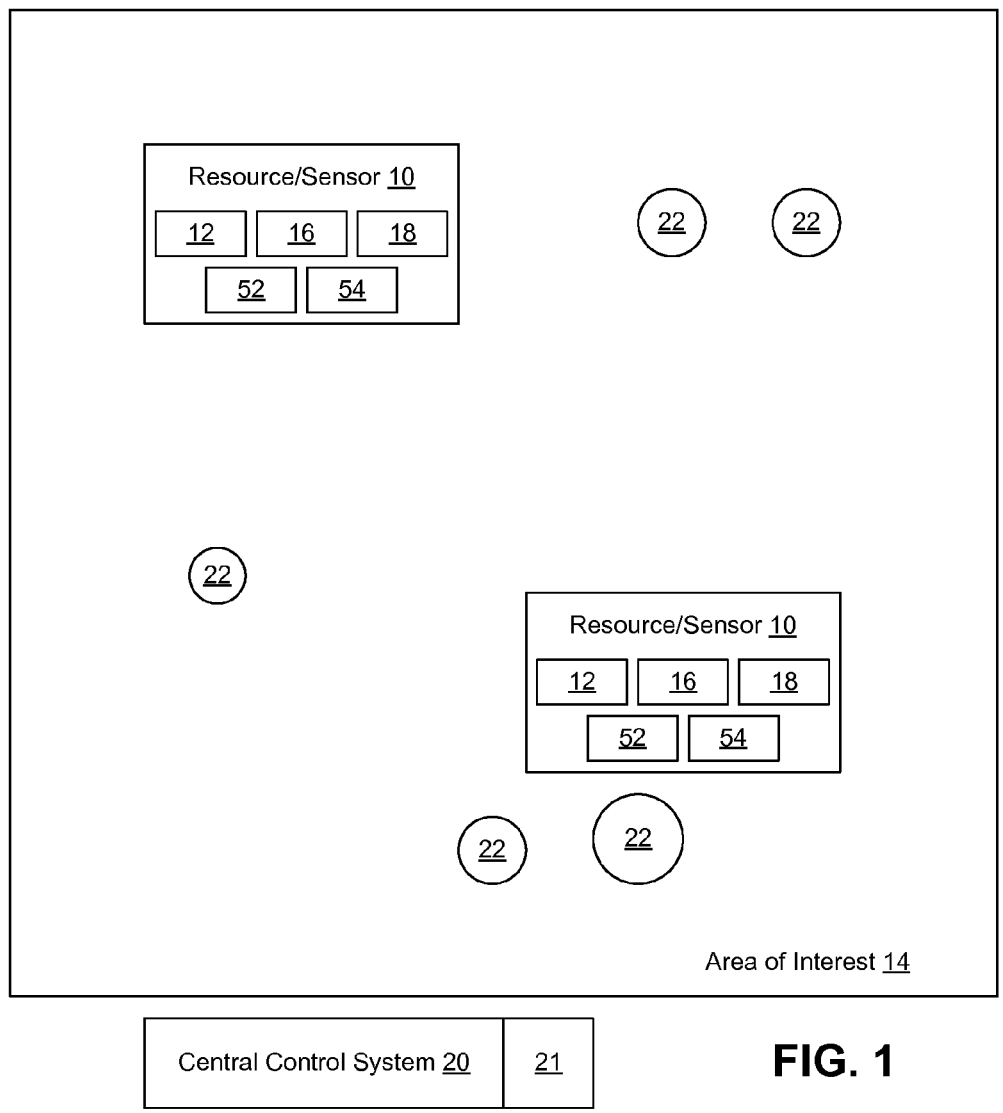
FIG. 1 is a schematic representation of a sensor system.

Embodiments will now be described with reference to the drawings, wherein like reference numerals are used to refer to like elements throughout. It will be understood that the figures are not necessarily to scale.

1. Introduction

This document describes systems and techniques for multi-mission planning and resource management. Described is an approach for long-term, closed-loop management and planning of distributed, heterogeneous unmanned autonomous mobile resources. In a representative embodiment used throughout this document for purposes of an exemplary description, the mobile resources are unmanned aerial vehicles (UAVs) that collectively have sensing and weapon capabilities, and that have multiple mission goals such as searching for enemy targets over a large area of interest, localizing the enemy targets, and destroying the enemy targets. Other tasks could include jamming and/or decoy operations. The planning involves optimization of the sensor and weapon resources, including the paths taken by the resources, and the allocation, scheduling and tasking of the resources, in near real time, to maximize an objective function with multiple goals that may be specified by a user. In some situations, a hostile adversarial force may be present with the capability of destroying the resources. In another embodiment, the mobile resources may be unmanned ground vehicles (UGVs) or a combination or UAVs and UGVs. It will be appreciated that the disclosed techniques may be applied to other types of operational contexts and/or without adversarial forces. Other exemplary contexts may include, for example, tasking robots, machines or people to carry out one or more functions or tasks.

1(A). Exemplary Operational Context

In military surveillance, tracking and enemy engagement situations, system performance goals are often varied and complex. Critical decision making at various levels is usually done by human operators. Such decision making may include tasks such as assessing the current situation based on an analysis of a large amount of information, determining what needs to be done to remedy or improve the current situation to meet system goals, and determining appropriate actions, including sensor tasking, based on current the situation. At all levels, the operator has to evaluate a large number of possible options in a short amount of time and may be overwhelmed by the analysis. This can result in inefficient utilization of resources and poor system performance, especially where the area of interest is relatively large, there is a long term look ahead horizon, there may be multiple and/or different goals for each resource, and an adversarial force may be present. Therefore, the described techniques have been developed to provide an automated approach to replace or assist the operator in his or her decision making process.

The disclosed techniques are well suited for any netted system comprised of multiple, distributed, heterogeneous resources. Using the disclosed techniques, it is possible to manage resources in such a system so as to achieve maximal performance, where the performance is expressed as an objective function.

For example, the techniques are well suited to defense and military applications that involve allocating and scheduling resources to satisfy one or more time critical objectives. Specific examples include military planning and dynamic resource management, as may be found in advanced combat systems, netted sensors, homeland security applications, future combat systems, unmanned systems, autonomous systems, missile defense systems, and so forth. In both planning and dynamic resource management scenarios, limited time-critical resources need to be allocated to optimize one or more objectives. The techniques may be extended and applied to any system that makes decisions based on collected information to control resources, and need not be applied to defense and military applications.

1(B). Resource Tasking

Aspects of the disclosed systems and methods involve branch and bound techniques to solve the combinatorial problems involved with resource management tasks. The branch and bound techniques may be used to reduce the effective size of the search space and provide a deterministic solution. The disclosed branch and bound techniques use efficient heuristics that allow for effective near real-time planning of distributed, heterogeneous resources over large areas and long-term look-ahead horizons, but with low computational and memory costs. In comparison, various meta-heuristic methods, such as genetic algorithms and particle swarm optimization, may give very different solutions for the same initial and starting conditions.

The disclosed techniques build on the sensor tasking techniques described in U.S. patent application Ser. No. 12/543,665, filed Aug. 19, 2009 and titled "System and Method for Resource Allocation and Management," the disclosure of which is incorporated by reference in its entirety. In that document, described are techniques for long-term, closed-loop management and planning of distributed, heterogeneous sensor resources for intelligence, surveillance and reconnaissance (ISR). Those techniques may be used to optimize sensor resource allocation, scheduling and tasking, in near real time, to meet user information collection goals.

To best understand the systems and techniques for multi-mission planning and resource management that are the focus of this document, a review of the techniques from the above-reference application will be described under section heading number two (2) immediately below.

2. Branch and Bound Resource Tasking for Target Sensing

FIG. 1 illustrates an exemplary operational context in which the described resource allocation techniques may be used. FIG. 1 illustrates a resource system that includes mobile resources, which, for target sensing, will be referred to as sensors 10. By way of example, the sensors 10 are unmanned aerial vehicles (UAVs) that include sensing equipment 12 for conducting ISR and that are configured to fly over an area of interest (AOI) 14. But it will be understood that the sensors 10 may be other types of sensors, such as manned aircraft, vehicles, robots, persons, etc.

Each sensor 10 may include a control assembly 16 for carrying out the functions described herein. The control assembly 16 may interface with a communications assembly 18 that establishes operative communications with other sensors 10 and/or a central control system 20. It will be understood that an intervening network or other equipment may be present in the communication paths between and among the sensors 10 and the central control system 20.

The control assembly 16 may include a processor for executing logical instructions in the form of a computer program that embodies the disclosed techniques and a memory representing a non-transitory computer readable medium for storing an operating system, computer programs, data and so forth. The memory may be, for example, a magnetic, optical and/or electrical data storage device, and/or an assembly of memory devices that have volatile and/or non-volatile data storage capabilities. The processor may interface with the memory so as to form a computer system in which the memory is used for long term data storage and system memory.

Also, or in the alternative, the described functions may be carried out by the central control system 20. In some embodiments, the described functions may be distributed between the sensors 10 and the central control system 20, or one may serve as a backup for the other. The central control system 20 may be configured as a computer system with an interface to communications equipment 21 that establishes communications with the sensors 10. Accordingly, the central control system 20 may include a processor for executing logical instructions in the form of a computer program that embodies the disclosed techniques and a memory representing a non-transitory computer readable medium for storing an operating system, computer programs, data and so forth. The memory may be, for example, a magnetic, optical and/or electrical data storage device, and/or an assembly of memory devices that have volatile and/or non-volatile data storage capabilities. The processor may interface with the memory so as to form a computer system in which the memory is used for long term data storage and system memory.

Therefore, the functionality described in this document may be embodied as an apparatus in the form of a non-transitory computer readable medium that stores a program and the program may be executed by a processor. For the sake of brevity, actual computer code listings are omitted. However, the algorithmic and logical flow of such a program will be understood from the following description and appended figures.

According to some embodiments, the systems and methods involve a hierarchical approach of sensor tasking that include near real-time planning on a global level and a local level and to provide an optimized sensor management plan over large ISR areas and long-term look-ahead horizons. The techniques may be applied to manage distributed, heterogeneous resources, where a resource may be a sensor, autonomous vehicle, machine, or even a human.

2(A). Sensor Management Parameters

2(A)(i). Area of Interest (AOI)

As indicated, there may be a known area of interest (AOI) 14. The AOI 14 may have a size, or area A, and the AOI 14 may be specified using a known geographic location and boundaries. The AOI 14 may contain multiple targets 22 for investigation by the sensors 10. The number and location of the targets 22 may be initially unknown.

For purposes of sensor 10 tasking, the AOI 14 is divided into a grid having discrete grid cells. In the illustrated examples, the AOI 14 is rectangular and the grid cells are squares. It will be understood that the AOI 14 and the grid cells may have other shapes. The grid may be I grid cells wide and J grid cells long, resulting in an IxJ grid. Therefore, each grid cell location may be denoted as $g_{i,j}$ where $(i, j) \forall i=1, 2\ldots I, j=1, 2\ldots J$. For simplicity, it may be assumed that each grid cell has the same size a, with $A=(I)(J)(a)$.

2(A)(ii). Prior Intelligence

Prior intelligence may be available as a target probability (or likelihood) map for the AOI with a probability value specified for each grid cell. The target probability for a grid cell $g_{i,j}$ may be denoted $v_{i,j}$. Also, the sum of all probability values may equal one as expressed by $$\sum_{i=1}^{I}\sum_{j=1}^{J} v_{i,j} = 1.$$

In the described formulation, the "information" that can be collected in a grid cell is proportional to the grid cell's target probability. Thus, higher $v_{i,j}$ values indicate more information that should be collectable from the corresponding grid cell $g_{i,j}$.

2(A)(iii). Sensor Model

There are a total of K sensors 10 that may collect information from the AOI 10. In the case where the sensors 10 are UAVs, the UAVs may fly over the AOI 14 and collect information therefrom. In one embodiment, the initial location of each sensor 10 is assumed to be directly over the AOI 14 and its position relative to the AOI 14 is known. For this embodiment, it may be assumed that the sensors 10 fly at a fixed vertical height over the AOI so as to travel in a two-dimensional (2D) plane (e.g., in-plane, x-y motion).

In the x-y coordinates, each sensor may fly from the center of one grid cell to any of its neighboring grid cells. In addition, each sensor also may stay at its current location. Sensor movement may be restricted to a discrete number of move types. Two sets of exemplary move types are contemplated, but others may be possible. The first exemplary set assumes that the sensors 10 may move in any of the four cardinal directions, including north, south, east, and west. The second exemplary set assumes that the sensors 10 may move in any of the eight ordinal directions, including north, northeast, east, southeast, south, southwest, west, and northwest.

Each sensor may be assumed to have a fixed speed and the time taken to move from one grid cell to the center of an adjacent grid cell depends on the distance traversed. For simplicity, diagonal and lateral moves are treated identically, even though the actual distance traveled when making a diagonal move is greater than a lateral move. This approximation is made so that the future movement action of multiple sensors 10 may be considered jointly. In other embodiments, this simplification may be removed.

2(A)(iv). Observation Model

An assumption is made that sensors 10 may move continuously, but only make observations at discrete time steps (e.g., every quarter second, every half second, every second, every ten seconds, every minute, and so forth). In one embodiment, the planning may be updated at every time step. At each time-step, each sensor observes the grid cell directly beneath itself, collecting a certain amount of information (or "data") from the grid cell. The amount of information collected in one observation is dependent on the collection rate, or probability of detection value, denoted by c of the sensor 10. Thus, if grid cell $g_{i,j}$ is observed by a sensor with a collection rate c, then the amount of information collected in one observation of that grid cell is $v_{i,j}*c$. For convenience, it may further be assumed that each sensor 10 has the same c, but other embodiments need not make this assumption. If $g_{i,j}$ is observed $n^{i,j}$ times, then the information collected is $v_{i,j}c^{n_{i,j}}$.

2(A)(v). Objective Function

The sensor search management may manage the K sensors 10 in order to maximize the rate of information collection from the AOI 14. As indicated, the information available at each grid cell is proportional to the target probability value for that grid cell. Sensor management involves determining the order of observations (e.g., the grid cells to which the sensors should move and observe) in order to maximize information collection. At each time-step, each sensor observes the grid directly beneath itself, collecting a certain amount of data from the grid and reducing the grid cell's target probability value (or available information). Therefore, the sensor management objective function may be defined using equation 1 as the sum of the target probability values of all the grid cells.

$$O = \sum_{i,j} v_{i,j} c^{n_{i,j}} \qquad \text{Eq. 1}$$

In equation 1, $v_{i,j}$ is the initial target probability value of the grid cell at coordinate (i, j), c is the sensor collection rate (which is defined as the probability of detection), and $n_{i,j}$ is the number of observations of the grid cell at (i, j). Accordingly, optimized sensor management minimizes the objective function.

A Naïve brute-force sensor management method would simply look for the set of actions with the highest value across the entire search space, which is of size $m^{dK}$, where m is the number of moves, d is the look-ahead depth, and K is the number of sensors. Assuming that a single sensor starts in the middle of an environment where IxJ represents a grid that is 78 grid cells by 78 grid cells in size, and the sensors can move in the eight ordinal directions, the search space would include $8^{39}$ (or $1.7 \times 10^{35}$) action combinations. Such a large number action combination is well beyond the capability of field deployable computers to find a sensor tasking solution in any reasonable amount of time.

2(B). Sensor Management

The following sections describe efficient branch and bound techniques to solve the above-described sensor management challenges. The disclosed branch and bound techniques intelligently prioritize the search space and provide deterministic solutions to sensor tasking In comparison, various meta-heuristic methods (e.g., genetic algorithms, particle swarm optimization, etc.) could give very different solutions for the same initial and starting conditions.

2(B) (i). Beginning Branch and Bound Function

The disclosed sensor management techniques may commence with a beginning branch and bound function. As will be described in later sections, modifications and extensions are added to the beginning branch and bound function.

The initial state of the system is represented by a root node that includes the probability map of the AOI 14 and the current positions of all of the sensors 10. This root node is used to generate a number of successor nodes, each of which represents the state of the system after executing a certain sensor action combination. Successors are then generated for each successor node, and this continues until the tree reaches a predetermined search depth d.

A path from the root node to each leaf node is known as a branch. Branches of the joint action space are pruned by eliminating action combinations that cannot beat a current best score, in even the most ideal circumstances. These ideal circumstances are quantified via a heuristic, which is a routine that calculates an absolute maximum amount of gain given a state and remaining look-ahead depth. It is expected that the disclosed heuristic will execute with ease using conventional computer resources of UAVs and/or the central control system 20. Also, the disclosed approach will return tasking solutions that will be close to the solutions that one would obtain by performing an exhaustive search of the possible solution space.

One embodiment of the beginning branch and bound function is set forth in pseudocode listing 1, appearing below. The function may start with an auxiliary function that generates successor nodes from a node undergoing evaluation (e.g., the root node).

Pseudocode Listing 1

Auxiliary Functions
    GenerateSuccessors
Algorithm BranchAndBound(depth, root)
    current_best := 0
    Successors := GenerateSuccessors(root)
    while |Successors|
        if first successor's depth is less than the look-ahead depth Pseudocode Listing 1 if first successor's g + h value is greater than the current best
            Successors += GenerateSuccessors(first successor)
        end if
    else
        if first successor's g value is greater than the current best
            current_best := first successor's g value
        end if
    end if
    delete first successor
  end while
end algorithm The heuristic of the beginning branch and bound function attempts to find the most promising path through the AOI 14 to acquire as much information as possible through the predetermined look ahead depth. The acquisition of information using sensors 10 may be compared to the "scooping up" of sand. For example, if the sensors were considered scoops that pick up sand present in the cell grids, one would want to be able to pick up as much sand as possible in the available number of steps. In this example, the entire AOI 14 may have a total amount of sand that may be picked up and this sand is unevenly distributed in the grid cells. Under this analogy, the beginning branch and bound function would determine which path to take to pick up as much sand as possible in a number of moves corresponding to the look ahead depth.

In pseudocode listing 1 for the foregoing beginning branch and bound function, the value g represents a best solution value for the path being investigated in that iteration of the function. Each iteration investigates what value is gained from going forward from a successor node corresponding to the iteration. Using the sand analogy, g would be the total amount of sand that would be picked up if one were to take a certain path from the node for that iteration. The value h represents a heuristic value as given by equations 2a and 2b appearing below. Therefore, for information collection, the sum of g and h predicts the maximum amount of information gathered using the sensors (or, under the analogy, the maximum amount of sand scooped) for the branch corresponding to the iteration of the function.

$$h = c \sum_{i=1}^{d} \text{best}(G_d) \qquad \text{Eq. 2a}$$

$$G_{d+1} = \text{update}(G_d, \text{bestpos}(G_d)), \; G_1 = G_{initial} \qquad \text{Eq. 2b}$$

As indicated, c is the probability of detection and d is the look ahead depth. G represents the total amount of gathered information through the series of steps.

The heuristic for the beginning branch and bound is specifically composed for sensor management. The heuristic functions by selecting the best d number of grid cells (or a number of grid cells equaling the look ahead depth) within progressively increasing radii centered at the sensor's current position. As each square is selected, the search grid is updated at the square's location. This process is given mathematically by equations 2a and 2b.

With additional reference to FIGS. 2A through 2D, the technique followed by the heuristic is shown graphically.

Figure 2A:
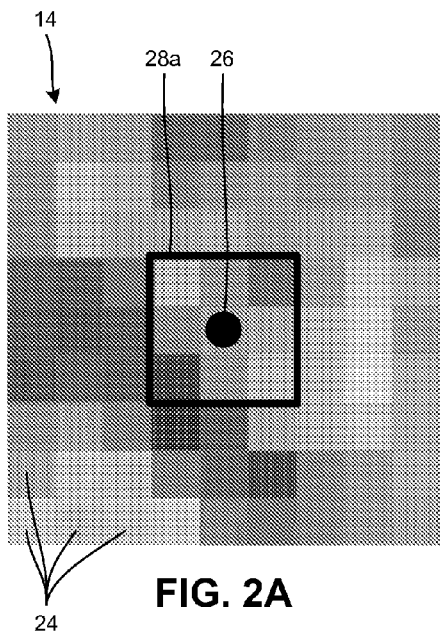
FIGS. 2A through 2D are representative schematic plots of a search grid in which sensor planning is carried out using a beginning branch and bound function.
Figure 2B:
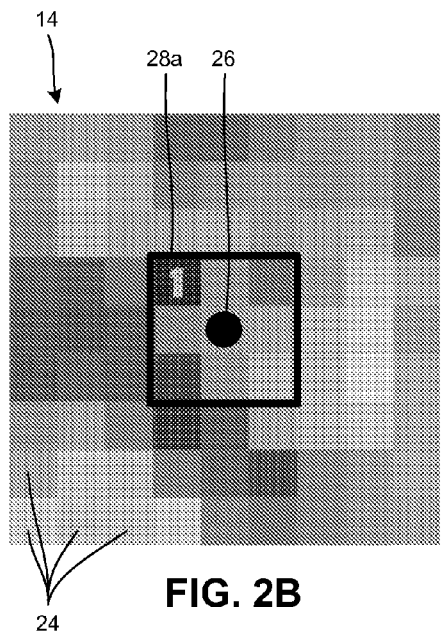
Figure 2C:
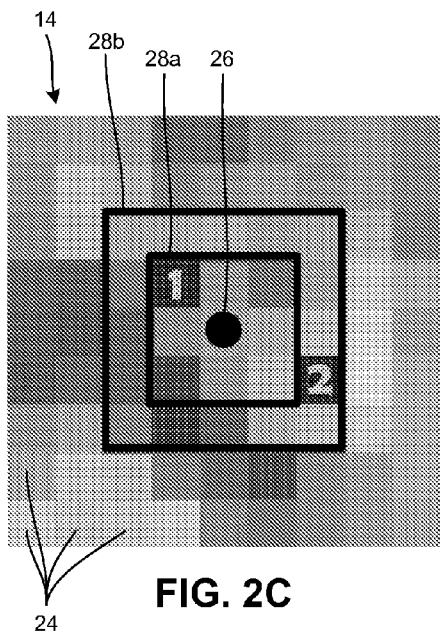
Figure 2D:
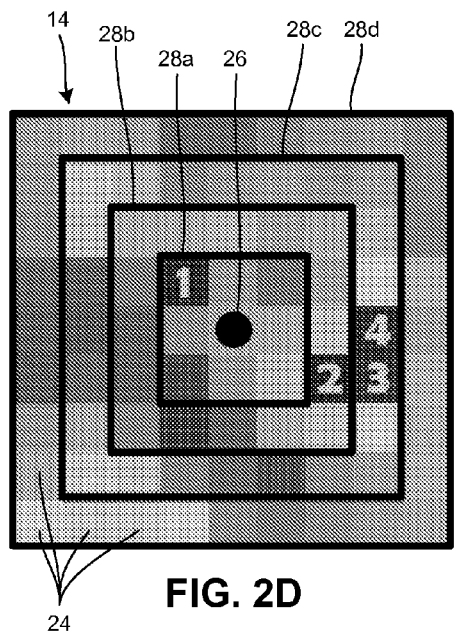

FIG. 2A shows initial conditions of a search area (e.g., the AOI 14), FIG. 2B shows the search area after one move, FIG. 2C shows the search area after two moves, and FIG. 2D shows the search area after four moves.

Starting with FIG. 2A, the AOI 14 is a nine by nine grid of grid cells 24. A starting point 26 is represented by a circle, which is in the center of the AOI 14 for purposes of an example. The distance that the sensor 10 may move in the step undergoing analysis is represented by a step outline 28, and this distance may be referred to as a search distance. In the example given by FIGS. 2A through 2D, the sensor may move in the eight ordinal directions or remain stationary. Therefore, in one step, the sensor 10 may be in any of the nine grid cells 24 within the step outline 28*a*.

Of the grid cells 24 within the step outline 28 for the corresponding step, the heuristic identifies which grid cell 24 would provide the most value if the sensor travelled to that grid cell 24. In the analogy of scooping sand, this would be the cell that contains the most sand that could be scooped in the corresponding step. For example, in FIG. 2B a cell grid 24 is identified with the number "1" to represent the grid cell 24 that may be reached in one move and that would provide the most value.

The heuristic continues until the look ahead depth is reached. For instance, in FIG. 2C, a step outline 28*b* is shown for a second step. As indicated, the step outline 28 for all steps is determined from the starting location 26 for the sensor 10 and not successively from the grid cell 24 that represented the best move in the prior step. This aspect of the heuristic means that the function is carried out without regard to the feasibility of the moves from step to step. For example, using the step outline 28*b* for the second move, the grid cell 24 with the most value is identified with the number "2." This grid cell may be reached in two moves from the starting location 26, but may not be reached in one move from the grid cell identified with the number "1."

The approach continues until the number of search steps corresponds to the predetermined look ahead depth. In the representative example of FIG. 2D, step outlines 28*c* and 28*d* are shown for third and forth steps. The grid cells within the step outline 28*c* may be reached within three moves from the starting location 26 and the grid cells within the step outline 28*d* may be reached within four moves from the starting location 26. The grid cells 24 with the highest move values for these steps are respectively shown with the number "3" and the number "4." In this illustration, it happens that the grid cell 24 labeled with the number "3" may be reached in one move from the grid cell 24 labeled number "2" and that the grid cell 24 labeled with the number "4" may be reached in one move from the grid cell 24 labeled number "3." As indicated, this need not be the case.

As will be apparent, the foregoing heuristic does not involve branching and no selection depends on the previous selection. Since actions selected by the heuristic do not have to be adjacent to each other, the set of actions may not be feasible by actual sensor movement in the corresponding number of steps. However, the heuristic will return a higher gain value than any set of "only feasible" actions, or equal to a set that includes only feasible actions when all moves in the solution identified by the heuristic happen to be feasible. Gain value is the amount of information collected (or, in the sand example, the amount of sand picked up) divided by the time it took to collect that information. Simulation results have determined that this heuristic is effective to prune over 95 percent of the search space.

2(B)(ii). Progressive Lower Bound Branch & Bound (PLB3) Function

In order to further improve the pruning efficiency of the basic branch and bound function described in the preceding section, a progressive lower bound heuristic may be used and will be referred to as a progressive lower bound branch & bound (PLB3) function. At the start of sensor 10 tasking, the beginning branch and bound function may be used to solve for the sensor movements and subsequent movements are determined using the PLB3 function.

The PLB3 function incrementally reuses previous solution information for faster computation of future movements. In one embodiment, the beginning branch and bound function is used to determine a solution for a limited number of time steps (e.g., the first time step or a number of time steps equaling the look ahead depth) and solutions for all subsequent time steps are determined using the PLB3.

At each time step, a solution for sensor tasking is determined for the predetermined look ahead depth. Therefore, tasking actions for the look ahead depth are known. The current $G_d$ value corresponds to the best chain of actions through the look ahead depth as determined by prior sensor tasking iteration. The current $G_d$ value may be used in setting an initial lower bound for the next iteration of the branch and bound function for the next time step.

Considering that the branch and bound function iterates at each time-step and only the number of actions corresponding to the look-ahead depth are evaluated, setting the initial lower bound for time-steps after the first time step (when the beginning branch and bound function is carried out) may include: 1) subtracting the value of the first action (or the value of moving from the current node to the next node) from the total value of the chain of actions (or the current $G_d$), and 2) adding the value of a greedy action taken at the end of the chain of actions. This "seeds" the branch and bound algorithm with an initial lower bound value greater than 0, which allows for earlier pruning.

Figure 3A:
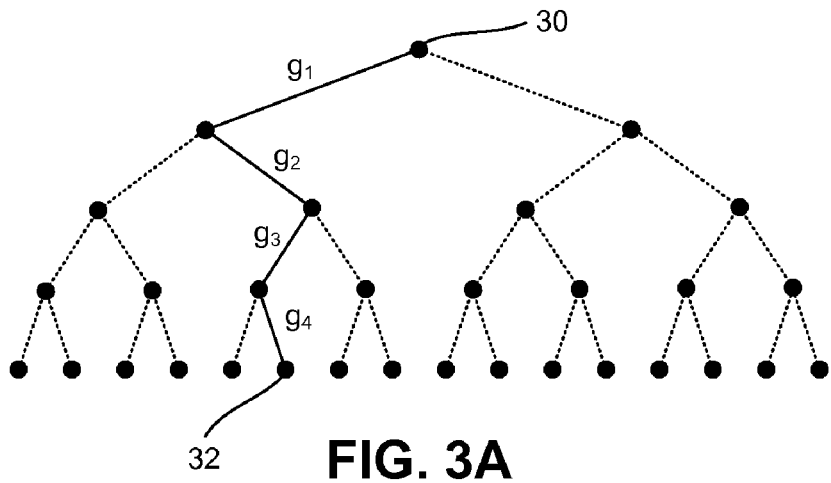
FIG. 3A is a representative node tree.
Figure 3B:
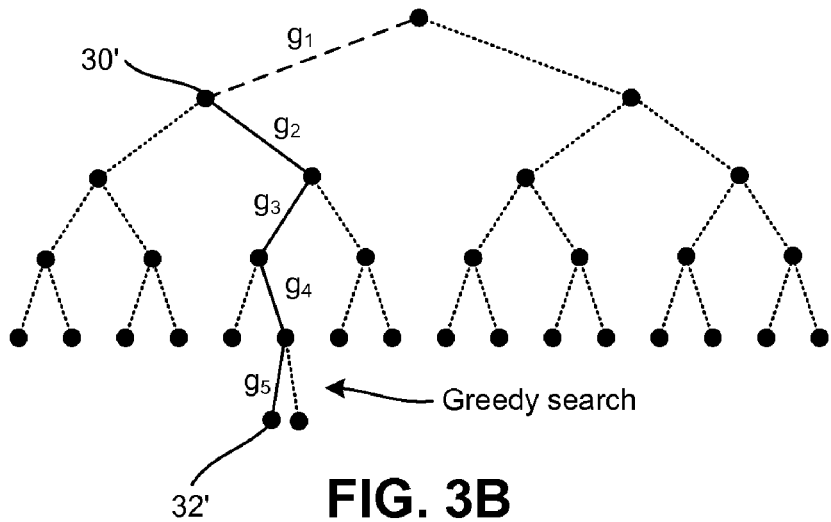
FIG. 3B is the representative node tree of FIG. 3A that has been updated for use in determining an initial lower bound value.

This operation is graphically represented by FIGS. 3A and 3B. FIG. 3A represents an exemplary solution determined by the beginning branch and bound function or a prior iteration of the PLB3 function. Starting at a current node 30 the path to an end node 32 at look ahead depth d is known. For simplicity, the illustrated example has a look ahead depth of four and each node has two possible branches stemming therefrom. The path from the current node 30 to the end node 32 is shown in solid lines, whereas the alternative branches are shown in dashed lines. Each move in the path has an associated value (labeled $g_1$, $g_2$, $g_3$ and $g_4$) that, when summed, equals $G_d$.

FIG. 3B shows the determination of the initial lower bound by performing a greedy search of the moves available from the end node 32 to determine a node (labeled 32') following the end node 32. Then, the initial lower bound is determined by summing the values in the path from the node (labeled 30') following the current node 30 to the node 32' following the end node 32. In the example, the lower bound is the sum of the values along this path, or the sum of $g_2$, $g_3$, $g_4$ and $g_5$. This is computationally equivalent to adding $g_5$ to $G_d$ and subtracting $g_1$, as described above.

One embodiment of the PLB3 function is set forth in pseudocode listing 2 appearing below. The function may start with an auxiliary function that generates successor nodes from a node undergoing evaluation and an auxiliary function that generates the initial lower bound by using the previous "best" to set the initial lower bound.

Pseudocode Listing 2

```
Auxiliary Functions
    GenerateSuccessors
    ProgressiveLowerBound
Algorithm BranchAndBoundWithPLB(previous_best_actions)
    current_best := ProgressiveLowerBound(previous_best_actions)
    Successors := GenerateSuccessors(root)
    while |Successors|
        if first successor's depth is less than the look-ahead depth
            if first successor's g + h value is greater than the current
            best
                Successors += GenerateSuccessors(first successor)
            end if
        else
            if first successor's g value is greater than the current best
                current_best := first successor's g value
                Best_actions += first successor's action
            end if
        end if
    end while
end algorithm
```

A difference between PLB3 function and the beginning branch and bound function is that any action chains that were previously marked as the best action chain and share the same first action as the current best action chain are saved and used for sensor tasking. This is done because the additional action chains might potentially yield a greater lower bound, and calculating the adjusted lower bound for an action chain is computationally inexpensive compared to the branch and bound operation itself.

Figure 4:
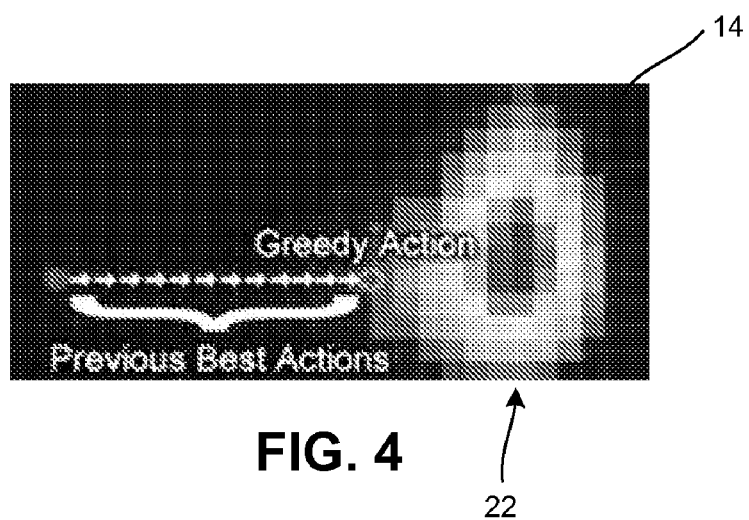
FIG. 4 is an exemplary spatial representation of a progressive lower bound branch and bound (PLB3) function.

This is illustrated in FIG. 4 where a target 22 is illustrated in a lighter color background than surrounding areas of the AOI 14. More specifically, FIG. 4 is a spatial representation of the PLB3 function. The white arrows represent the actions that make up the action chain determined at the previous time-step. The dark arrow represents the best single action taken after the last action of the pre-determined action chain. If a sensor is en route to an area of high value (e.g., a target 22), it is likely the future actions will remain on this path. Therefore, in the exemplary representation of FIG. 4, it is unlikely that the first 12 actions (shown by the white arrows) will change as the sensor gets closer to the target 22. The effect of using the value of the previous action chain is to preselect the remaining moves and potentially eliminate the rest of the tree very quickly.

Even assuming this large pruning rate of the PLB3 function, the number of actions in the joint action space to completely cover an AOI with a grid size of 78 by 78 grid cells is about $10^{29}$, which is still incomputable in a reasonable period of time given the available resources. One way to reduce the computational complexity is to reduce the look-ahead depth to a value that reduces the action space to a level for which modern computers can return a solution in a reasonable amount of time. For a single sensor with 8 possible moves, an exemplary look-ahead value is about 12 time-steps. Unfortunately, only a tiny fraction of the AOI would be explored by the sensor under this approach (e.g., $24^2/78^2 = 9\%$). Using the PLB3 function with a relatively short look-ahead depth may be able to optimize local tasking performance. But searching performance over the entire AOI (assuming that the AOI is relatively large compared grid cells reachable in the look ahead depth).

2(B)(iii). Hybrid Local-Global Branch and Bound (HLGBB) Function

To improve search performance for the entire AOI 14, a global look-ahead capability may be added to the sensor management operation. This may be accomplished by performing a global branch and bound function (also referred to as a global planner) and a local branch and bound function (also referred to as a local planner). The global branch and bound function may generate general destinations within the AOI 14 for the sensors 10. In the case of UAVs, the general destinations result in the establishment of a coarse flight path. The local branch and bound function operates to determine the exact flight path (e.g., slight deviations from the coarse flight path) so that the sensor acquires maximum information while travelling along the coarse flight path and travels to a high value portion in the area of the general destination.

In one embodiment, the global branch and bound function involves conducting the beginning branch and bound function and the PLB3 function using a coarse grid size for the AOI 14 and the local branch and bound function involves conducting the beginning branch and bound function and the PLB3 function using a fine grid size for the AOI 14. As an example, the fine grid may be a grid of 78 grid cells by 78 grid cells and the coarse grid may be a grid of 12 grid cells by 12 grid cells. In one embodiment, the ratio of the number of grid cells in the coarse grid to the number of grid cells in the fine grid may be in the range of about 1:4 to about 1:10.

The approach of using a global planning function and a local planning in this fashion may be referred to as a hybrid local-global branch and bound (HLGBB) function or as a multi-tiered branch and bound function since the hybrid approach includes multiple levels, or tiers, of sensor planning. One tier may be on a global basis to plan gross movement and another tier may be on a local level to plan fine movement along the gross movement plan.

In the disclosed approach, the global branch and bound function is carried out for the current position of the sensors to determine a best possible move in a general direction on the coarse grid. Planned movement through the coarse grid would naturally run through plural corresponding grid cells from the fine grid. The disclosed approach includes carrying out the local branch and bound function for the sensors under the constraint that the grid cells from the fine grid cells considered by the local branch and bound function are reachable from the path determined by the global function within the look-ahead depth for the local function. The sensors may then be tasked to follow the solution determined by the local function. In effect, local planning is superimposed on global planning.

The look ahead depth for the global function may be different from the look ahead depth of the local function. For instance, the local look ahead depth for the local function may be about two to about ten times longer than the look ahead depth for the global function.

More detailed operation of the hybrid planning approach will now be described. In one embodiment, the global branch and bound function mosaics the AOI 14 into a grid that has lower resolution than the local grid. This enables the beginning branch and bound function and the PLB3 function of the global branch and bound function to cover the entire AOI 14 with a smaller look-ahead depth than the local branch and bound function. For a single sensor in an example where the coarse grid is 12×12 and the fine grid is 78×78, the global planning for the space is manageable with a look-ahead depth of less than 12. For more sensors, the coarse grid could be made coarser to compensate for a larger branching factor.

One embodiment of the HLGBB function is set forth in pseudocode listing 3 appearing below.

Pseudocode Listing 3

Algorithm LocalGlobalManager (local_depth, global_depth)
    global_root := GenerateGloableRootNode (UndecidedSensors)
    GlobalActions :=GloableBranchAndBound (global_depth,
    global_root)
    SendActionsToSensors (GlobalActions)
    UndecidedSensors −= GetDedicatedSensors (GlobalActions)
    local_root := GenerateLocalRootNode (UndecidedSensors)
    LocalActions := LocalBranchAndBound (local_depth, local_root)
    SendActionsToSensors (LocalActions)
end algorithm For purposes of hybrid planning of sensor movement to a grid cell from the coarse grid, the sensors may move in the cardinal directions or, if allowed, the ordinal directions along the grid cells of the fine grid. An endpoint for a coarse grid cell is defined as the fine grid cell within the corresponding coarse grid that serves as the final destination for a global move. As part of the planning, movement to a global grid cell's endpoint may be accomplished by taking the shortest path from the current position to the endpoint, with the constraint that all moves are allowable under the local planning FIG. 5A illustrates an exemplary path when sensor moves include the cardinal directions and FIG. 5B illustrates an exemplary path when sensor moves include the ordinal directions.

To plan a move for the global branch and bound function, each coarse grid cell is assigned a value. In one embodiment, the value of each coarse grid cell is deemed to be the value in travelling to the endpoint of the corresponding coarse grid cell. These values may be determined for each coarse grid reachable in the global look ahead depth, including the coarse grid cell in which the sensor is currently located.

With additional reference to FIG. 6, there are several ways to select the fine grid cell that serves as the endpoint for a potential global move. Exemplary techniques include a center of mass technique and a projections technique. As shown in FIG. 6, however, the center of mass and projection techniques may produce endpoints that are in areas of little or no value within the corresponding coarse grid cell. This may make a coarse grid cell with high value targets unattractive during the planning process.

Therefore, an alternative approach is to use the fine grid cell identified by the local branch and bound function as the endpoint. This endpoint is identified in FIG. 6 by the designation "heuristic method." Under this approach, the fine grid cell with the highest local planning value resulting from the above-described heuristic returns an endpoint that suitably represents the overall value offered by a particular coarse grid cell and under the local look-ahead depth.

The endpoints considered during the global branch and bound function may correspond to coarse grid cells reachable within the global look ahead depth, including the endpoint of neighboring coarse grid cells and the coarse grid cell in which the sensor is currently located. The endpoint of the current coarse grid cell may be included since it is possible that the local branch and bound function may not fully cover an individual coarse grid cell, especially when many sensors are included in the planning However, it is possible to exclude the endpoint of the current coarse grid cell if this endpoint is reachable within the local look-ahead depth (also referred to as the local search distance).

Another fine grid cell may be added to the consideration of the global branch and bound function. Namely, the fine grid cell corresponding to the sensor's current position may be added. This potential move may be included to simulate running the local branch and bound function at the sensor's current position.

In the local branch and bound function, defining value and cost for each action is accomplished by obtaining g values from the results of executing a series of tangible moves. Defining the value and cost for each action in the global branch and bound function may be more challenging since it may be impractical to calculate the value of local search moves in the global planner. Therefore, the g and h values returned by moves in the global branch and bound function may be approximated.

In one embodiment, g is defined differently for the two types of moves available to the global branch and bound function. The two types of moves include moving to a neighboring coarse grid cell and staying in the current coarse grid cell. For moves to another global grid cell, g may be assumed to be zero. For the "move" of remaining in the current coarse grid cell (which may be considered simply as a "local search global move"), g is assigned a value according to equation 3, which is the h value of the local planner at the destination fine grid cell divided by $d_{local}$, where $d_{local}$ is the number of local moves needed to reach the destination fine grid cell.

$$g_{global} = \frac{c}{d_{local}} \sum_{i=1}^{d} \text{best}(G_d) \qquad \text{Eq. 3}$$

Following this approach, moves that involve traveling to an endpoint of neighboring coarse grid cells are assigned a value of 0, and a cost equal to the amount of time to travel to the endpoint. Moves within the current coarse grid (e.g., moves that result in instruction to the sensor 10 to use the local branch and bound function) are assigned a value equal to the heuristic value at the end point, or destination fine grid cell determined by the local planner, and a cost equal to the local look-ahead depth. As an example of this approach, Table 1 shows an action chain that contains six exemplary moves with individual action values and costs.

TABLE 1

| Move # | Action | Value | Cost |
|---|---|---|---|
| 1 | Move to neighboring cell's endpoint | 0 | 14 |
| 2 | Run local planner | 0.34 | 6 |
| 3 | Run local planner | 0.29 | 6 |
| 4 | Move to current cell's endpoint | 0 | 8 |
| 5 | Move to neighboring cell's endpoint | 0 | 12 |
| 6 | Run local planner | .36 | 6 |
| | TOTALS: | 1.09 | 52 |
| | Ratio | | 0.02096 |

Table 1 also includes totals for the values and costs, and a ratio of the total value to the total cost. This ratio may be compared against the current best set of actions in the branch and bound planning function to reach a deterministic solution.

In one embodiment, if the first action in the chain is a move to endpoint action, a command may be generated to instruct the corresponding sensor to undertake this global move action and a state of the sensor may be set to "decided." If the first action is a run local planner action, no command may be generated for the corresponding sensor and a state of the sensor may be set to or remain "undecided." Any sensors that are undecided after the global planner has finished executing will be included in the local planning process.

In one embodiment, if a sensor is commanded to carry out a global move, this sensor is removed from the planning process until it reaches the destination associated with the global move. This approach may minimize the occurrence of certain boundary issues that may arise when a sensor crosses the border of the current coarse grid cell to an adjacent grid cell. In this regard, the actions of these sensors may be considered to be fixed, but the results of their actions are still considered by any sensors that continue to be involved in the planning process. This may be accomplished by updating the probability map so that the information collection measurements that a sensor makes en route are applied as if the sensor has already moved to its final destination.

As indicated, the planning function(s) (e.g., the beginning branch and bound function, the PLB3 and/or the HLGBB, inclusive of global planning and/or local planning) may be carried out by the central control system 20. In this case, the central control system 20 may receive input data from each sensor 10 regarding sensor position and information collection measurements. The input data is used to plan the movements of each of the sensors 10. This plan is relayed to the sensors 10 as commands and, in response, the sensors 10 move in accordance with a next move command. Subsequent iterations of the movement planning may be made to generate additional next move commands that are transmitted to the sensors 10.

In another embodiment, the planning function(s) (e.g., the beginning branch and bound function, the PLB3 and/or the HLGBB, inclusive of global planning and/or local planning) may be carried out by one or more of the sensors 10. In one embodiment, each sensor carries out planning operations in coordination with the planning operations of the other sensors 10. Each sensor 10 may receive position and information collection measurement information from all of the other sensors 10 for use in movement planning In such a fully networked system, each sensor 10 has a similar probability map of the AOI 14 and, therefore, will likely arrive at the same movement plan and each sensor 10 will individually be able to ascertain which move to undertake for itself. While this architecture is distributed in nature, each sensor 10 may carryout the same logical operations in parallel.

2(C). Example Simulations

Two simulation scenarios will be used to compare and contrast the various branch and bound techniques that are described in prior sections. The scenarios involve value maps and initial sensor positions, and include sensor movement capability (e.g., cardinal movements or ordinal movements).

Figure 7A:
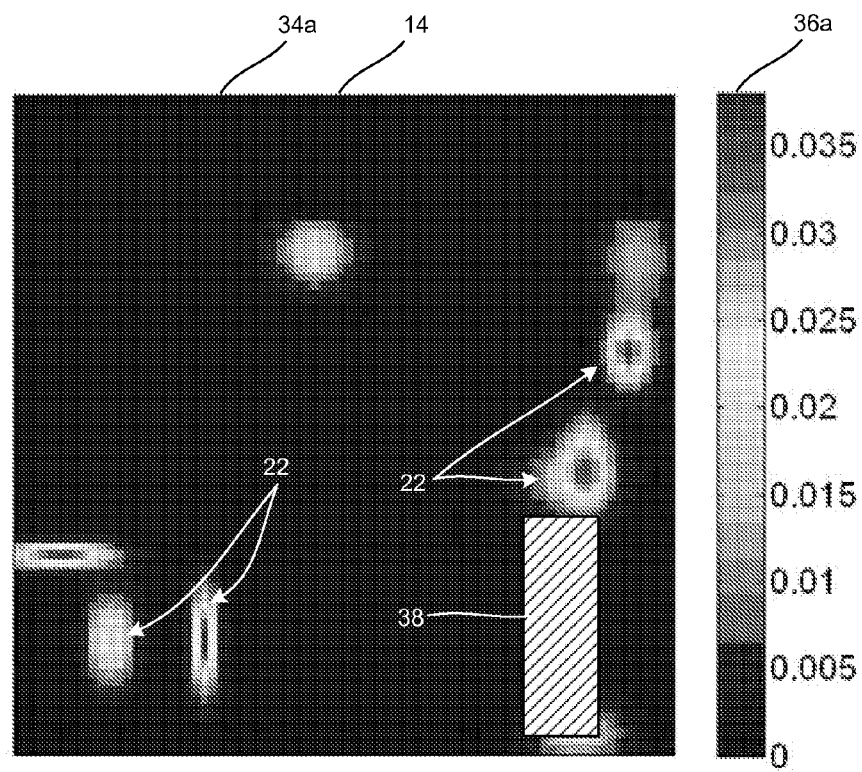
FIGS. 7A and 7B are representative initial probability maps for use in sensor planning simulations.

FIG. 7A illustrates an initial probability map 34a for an AOI 14 under a first exemplary scenario. The first scenario relates to an AOI 14 with a fine grid of 78 by 78 grid cells. The map 34a of FIG. 7A is constructed by assuming target 22 presence in certain grid cells and then generating a scaled Gaussian probability distribution around the center of those grid cells with a random variance. Large variances indicate uncertain target 22 positions. For illustration purposes, a scale 36a is depicted with the map. The scale 36a of the Gaussian indicates the likelihood of the presence of a target 22. The higher the value along the scale 36a, the more value that a grid cell may have. One or more areas in the value map 34a may have a zero value to represent a no-fly zone 38.

Figure 7B:
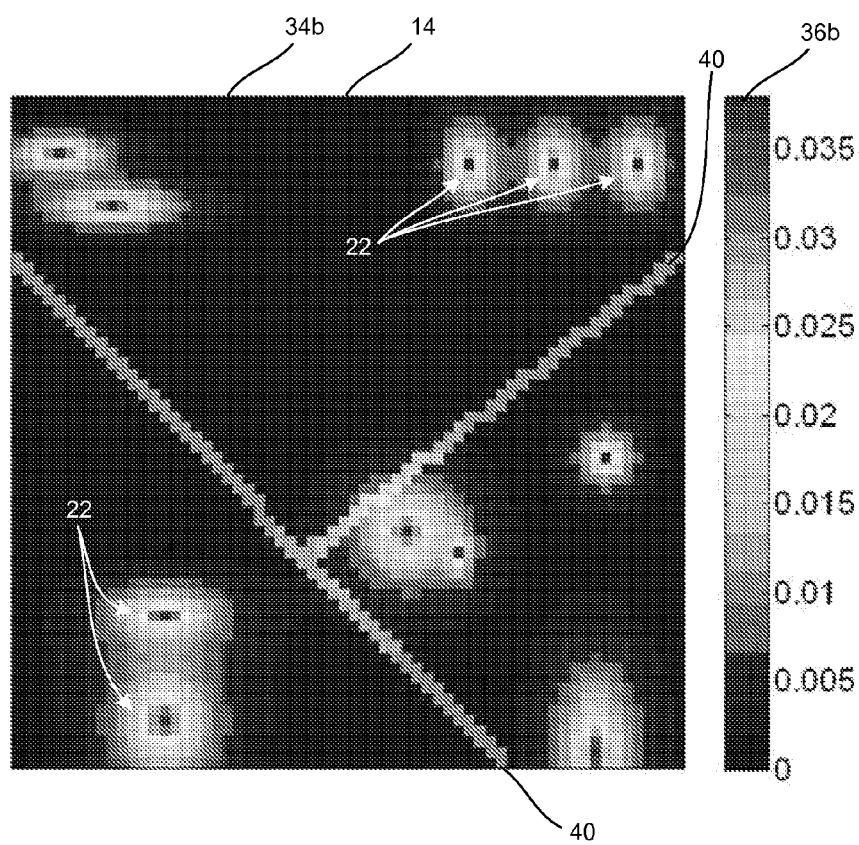

FIG. 7B illustrates an initial probability map 34b and scale 36b for an AOI 14 under a second exemplary scenario. The second scenario relates to an AOI 14 with a fine grid of 64 by 64 grid cells. The map 34b of FIG. 7B is constructed by assuming target 22 presence in certain grid cells and then generating a scaled exponential probability distribution around the center of those grid cells with a random variance. Large variances indicate uncertain target 22 positions. The scale 36b of the exponential indicates the likelihood of the presence of a target 22. The map 34b of the second scenario also contains lines 40 of relatively constant probability value. In this exemplary scenario, the lines 40 represent roads upon which ground traffic may travel. In the second scenario, any grid square below a predetermined threshold value has its value reduced to zero.

2(C)(i). Simulation Results—Comparison of Beginning Branch and Bound and PLB3

As described, PLB3 is used to pass over (or "leapfrog") much of the time spent in determining the lower bound each time the branch and bound function is carried out. This allows a large portion of the tree to be pruned in the very first few iterations of the routine. The first exemplary scenario (FIG. 7A) was used in simulations to compare the performance of the beginning branch and bound function and the performance of the PLB3 function.

Figure 8:
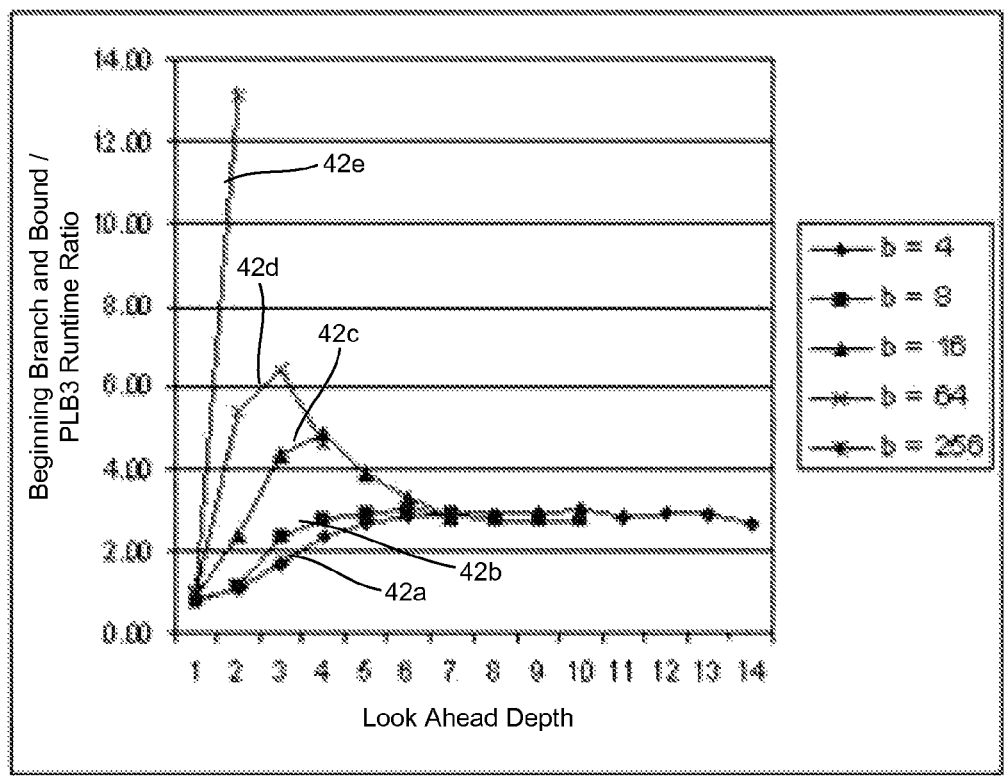
FIGS. 8, 9 and 10 are plots of performance under various simulations.

With additional reference to FIG. 8, illustrated are the performance results from these simulations. FIG. 8 is a graph that plots look ahead depth (x-axis) versus a runtime ratio of the beginning branch and bound function to the PLB3 function for several branching factors. In FIG. 8, curve 42a corresponds to a branching factor of 4, curve 42b corresponds to a branching factor of 8, curve 42c corresponds to a branching factor of 16, curve 42d corresponds to a branching factor of 64, and curve 42e corresponds to a branching factor of 256.

The curves of FIG. 8 show that the progressive lower bound of the PLB3 function reduces computational burden for look-ahead depths greater than one. At relatively large look ahead depths (e.g., greater than about seven), the improvement provided by the lower bound is slightly less than three. That is the PLB3 runs three times as fast as the beginning branch and bound function. Relatively large branching factors (e.g., sixteen or more) have a greater improvement in performance at look-ahead depths between two and six. Limited data points exist for the largest branching factors (e.g., 64 and 256) due to the large amount of computation time required. For instance, the runtime for a branching factor of 256 is on the order of days for a look-ahead depth of 3.

2(C)(ii). Simulation Results—Hybrid Local-Global Branch and Bound Algorithm (HLGBB)

Figure 9:
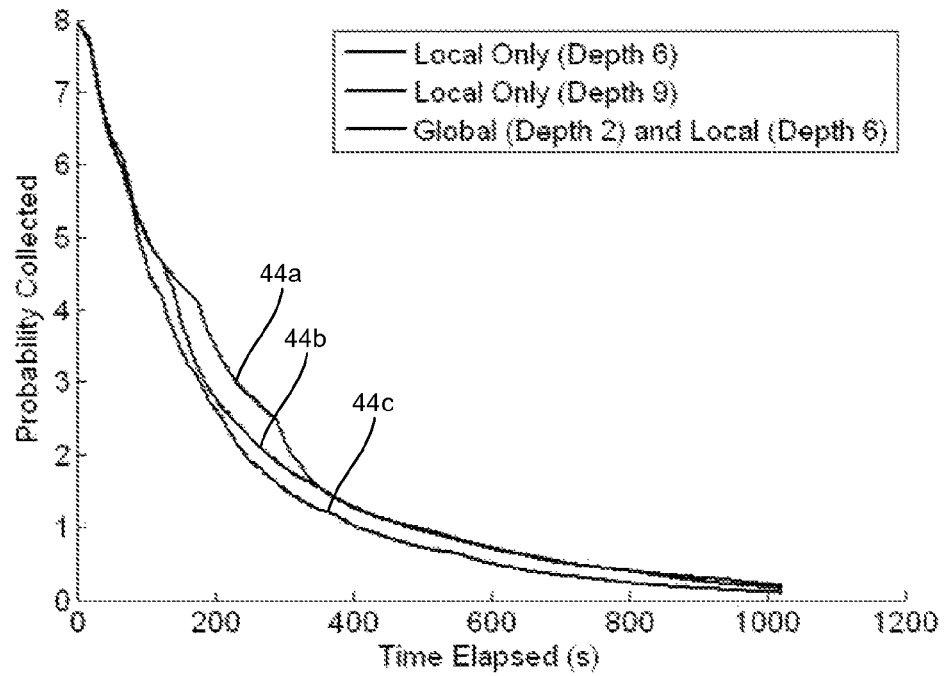

The HLGBB function and PLB3 function were simulated against each other. With additional reference to FIG. 9, shown is a plot of search entropy as a function of time for the execution of the PLB3 local planner with a look ahead depth of six (curve 44a), for the execution of the PLB3 local planner with a look ahead depth of nine (curve 44b), and for the execution of the two-tier HLGBB planner with local look ahead depth of six and global look ahead depth of two (curve 44c) that were carried out using the first exemplary scenario (FIG. 7A). Planning was made at one second intervals. Results of the simulation show that the HLGBB function is superior to the PLB3 function in optimizing the search objective function.

Figure 10:
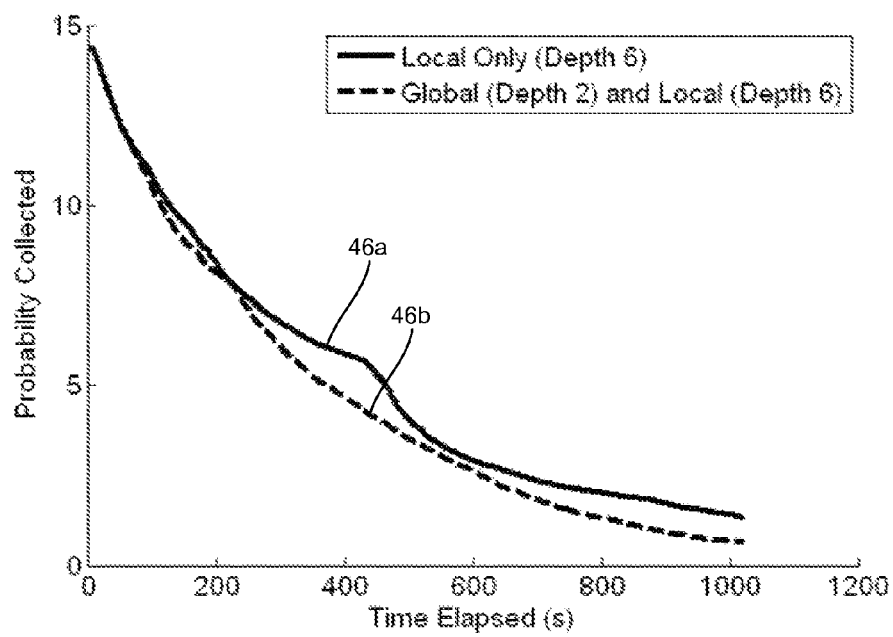

With additional reference to FIG. 10, shown is a plot of search entropy as a function of time for the execution of the PLB3 local planner with a look ahead depth of six (curve 46a), and for the execution of the two-tier HLGBB planner with local look ahead depth of six and global look ahead depth of two (curve 46b) that were carried out using the second exemplary scenario. Planning was made at one second intervals. Results of the simulation show that the HLGBB function is superior to the PLB3 function in optimizing the search objective function.

In addition, the HLGBB function used less computational resources than the PLB3 function.

2(C) (iii). Simulation Results—Network Loss

Various simulations were conducted to analyze the effects of loss of communication between groups of sensors 10. During the time of network loss, performance degraded. But following return of communications, system performance recovered so as to perform in close correlation to the performance of a control simulation where no network loss occurred.

2(C)(iv). Simulation Results—Prior Probability Map Mismatch

As will be appreciated, the initial probability map may not reflect the actual position or value of targets 22 in the AOI 14. Simulations were run to analyze the effect of a mismatch between actual conditions and initial probability maps.

Figure 11A:
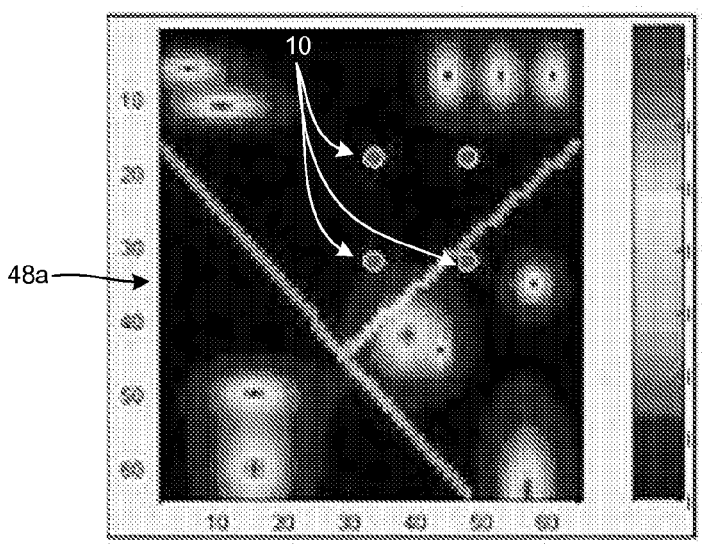
FIGS. 11A, 11B and 11C show probability charts used in probability map mismatch simulations.
Figure 11B:
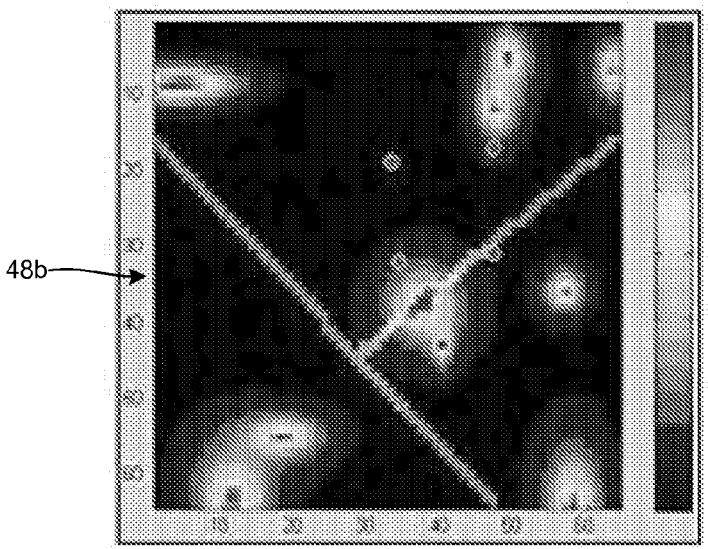
Figure 11C:
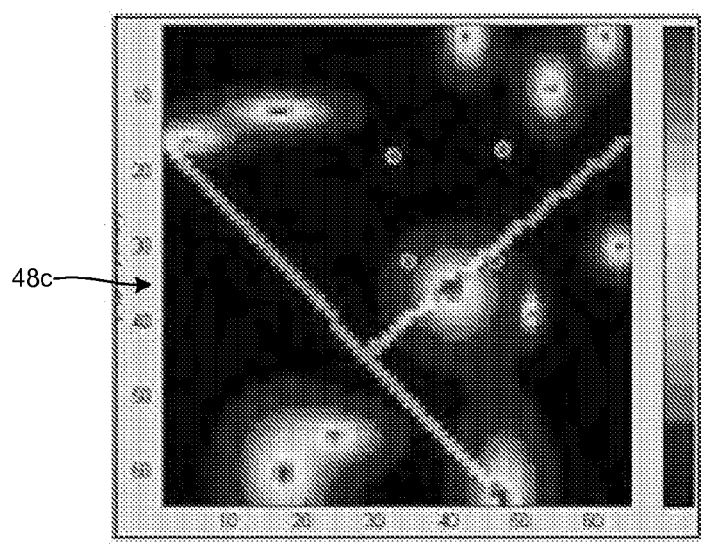

With additional reference to FIGS. 11A, 11B and 11C, illustrated are three probability maps 48 that are 64 by 64 grid cells. FIG. 11A represents an initial probability map 48a with ten local peaks representing the location of probable targets. The maps 48b and 48c of FIGS. 11B and 11C were generated by shifting the center of local probability map peaks in random directions with varying magnitudes. The magnitude for the map 48b of FIG. 11B is 5 grid cells (e.g., each peak is shifted by 5 grid cells relative to the map 48a) and the magnitude for the map 48c of FIG. 11C is 10 grid cells (e.g., each peak is shifted by 10 grid cells relative to the map 48a). The sigmas of the distributions are kept the same for purposes of the simulation.

Figure 12:
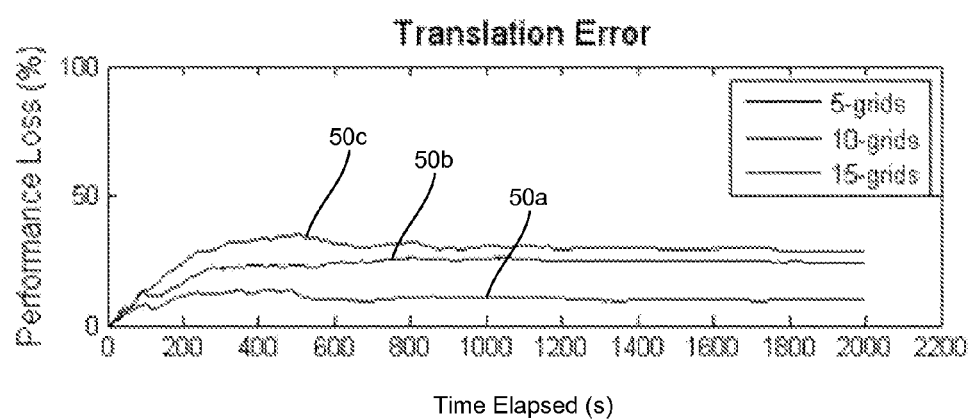
FIG. 12 is a plot of performance under the probability map mismatch simulation.

With additional reference to FIG. 12, shown is a plot of translation loss for three amounts of map mismatch errors. Planning was made at one second intervals. More specifically, curve 50a shows performance loss versus time for a shift magnitude of 5 grid cells, curve 50b shows performance loss versus time for a shift magnitude of 10 grid cells, and curve 50c shows performance loss versus time for a shift magnitude of 15 grid cells.

3. MULTI-MODE (MULTI-MISSION) RESOURCE TASKING

In the preceding section under heading number two (2), resources with target sensing capability were tasked to detect a target. In this section, additional capabilities of the resources will be considered. For instance, the resources may be used to precisely locate a detected target and attempt to destroy the target. This section of the document will describe how to determine the task, from plural possible tasks or modes, in which a resource should be engaged. The disclosed techniques use a hierarchical approach that plans based on both global and local needs in near real-time and provides an optimized multi-mission plan that optimizes across multiple disparate goals over large geographical areas and long-term look-ahead horizons.

In order for the branch and bound algorithm to prune the search space effectively to make these decisions, a quickly obtained and valid upper bound is desirable for purposes of function maximization. Although the construction of a good objective function is typically created by analyzing a particular domain, the derivation of its upper (or lower) bound is not trivial. The approach to upper bound determination described below satisfies many optimality and performance constraints and generates a relatively tight bound such that the benefits of pruning are not forfeited. The generation of the upper bound also is asymptotically fast so that the generation time does not adversely slow down the search algorithm.

With regard to optimizing multiple objectives and having adversarial forces working against resource efforts, most prior research has only focused on a single aspect of the domain due to problems with computational complexity. For example, partially observable Markov-decision processes (POMDPs), have been applied to adversarial domains, but the current state-of-the-art can only handle problems with very small orders of magnitude. Furthermore, these techniques result in characteristic differences than the approach described herein. For example, the disclosed techniques provide an optimal result within a bounded time horizon, whereas the work in sparse sampling and roll-out-based Monte-Carlo provides policies bounded in value to the optimal policy, at best.

Other work has proposed a two-stage process to solve the planning and allocation problem by first solving a path planning problem and then solving the task allocation problem. This technique may be able to handle large domains with state spaces on the order of magnitude described herein, but does not handle adversarial forces and does not address optimality within a particular planning horizon.

It may be noted that the techniques disclosed in this document are more complicated than just visiting a series of way points in a domain. For example, resource units in the described exemplary operational context search for and detect one or more targets, localize the target(s), and then destroy the target(s).

3(A). Multi-Mode Model

For purposes of description, the AOI and prior intelligence for multi-mode resource tasking are the same as those described above.

3(A)(i). Multi-Mode UAV Model

With returning reference to FIG. 1, resources 10 for multi-mode tasking management will be described. For purposes of exemplary description, it will be assumed that there are two different sets of unmanned autonomous vehicles, or resources. One set will be referred to as the blue team, which includes resources 10 (previously referred to as sensors 10). The other set will be referred to as the red team, which includes resources of the red team referred to as targets 22. The resources of the red team will be considered adversarial and hostile to the resources of the blue team. In the foregoing description of target sensing it was assumed that the targets 22 were stationary. In the following description of multi-mode tasking management, the targets 22 are capable of movement. therefore, the distance between a resource 10 and a target 22 will depend on movement of both the resource 10 and the target 22, rather than the just the resource 10.

The multi-mode tasking will be described with respect to the resources of the blue team. Tasking of the red team is outside the control of the entity responsible for the tasking of the blue team.

For purposes of exemplary description, the blue team will have K number of UAV resources 10. Each blue team resource 10 may have a subset of the following capabilities: a discovery mode (search) to gather information about whether or not there is a red team resource (a target) in the resource's field of view, a passive geolocation mode to reduce the localization error of targets within the resource's field of view, an active geolocation mode that cooperates with at least two other resources to reduce the localization error of a target, a kill mode that homes in on a target to destroy it, a jamming mode that decreases the learning rate of the red team, and a decoy mode (e.g., that increases the frequency of radar emissions from enemy radar). For purposes of target discovery and geolocation, the resources 10 may make use of their sensing equipment 12. For purposes of destroying a target 22, the resources 10 may make use of weapons 52. For purposes of jamming and/or decoy operations, the resources 10 may make use of emitter equipment 54.

The resource model allows for any combination of resource functions to be active at any one time. In another embodiment, each or some combination of these functions/modes may be on different types of UAVs. For example, a kill-type UAV (or K-type UAV) may have search, passive geolocation, and kill modes and a jamming-type UAV (or J-type UAV) may have search, passive and active geolocation and jamming capabilities.

For purposes of modeling, it will be assumed that the adversarial red team will have J number of resources 22, each of which has exactly one of the following capabilities: a passive geolocation mode (e.g., radar capability) that reduces the localization error of resources 10 from the blue team within the field of view for the red team's resource 22 for each radar emission the resource makes, or a kill mode that attempts to destroy resources 10 from the blue team (kill capability).

3(A)(ii). Search Mode

As indicated, in the multi-mode model there are a total of K blue team UAV resources 10 that are available to fly over the AOI 14 in a discovery mode and collect information. The initial location of the resources 10 is assumed to be directly over the AOI 14 and known. For this embodiment, we assume that the resources 10 fly at a fixed vertical height over the AOI 14, which corresponds to a two dimensional plane with only in-plane x-y motion. In x-y coordinates, each resource 10 may fly from the center of one grid cell to any of its neighboring grid or stay in its current cell in the manner described above for target detection. Again, for simplicity, diagonal and lateral moves will be treated identically even though the actual distance traveled when making a diagonal move is greater than a lateral move. This approximation is made so that multiple resources 10 consider their future actions jointly, but this simplification may be removed in other embodiments.

3(A)(iii). Observation Model

Similar to the target sensing operation described under heading number two (2), it will be assumed that the blue team resources 10 may move continuously, but can only make observations at discrete time steps. At each time-step, each resource 10 observes a circular footprint, called its field of view, of the grid directly beneath the resource 10 to collect a certain amount of information (referred to as data) from the grid cell. The amount of information collected in one observation is dependent on the collection rate (or probability of detection value), which is denoted by c of the sensor. Thus, if is observed by a resource 10 with collection rate c, then the amount of information collected in one observation of that grid cell is $V_{i,j}*c$. For convenience, it may be assumed that each sensor has the same c. If $g_{i,j}$ is observed $n_{i,j}$ times, then the information collected is $v_{i,j}c^{n_{i,j}}$. If the amount of information remaining in $g_{i,j}$ falls below a specified detection threshold, then it may be assumed that a red team target 22 has been discovered by the resources 10 of the blue team.

All newly discovered targets i are assigned an initial localization error, $\sigma_i$. In one embodiment, a detected target 22 may not be targeted for destruction until its localization error has been reduced below a specified threshold, after which it may be killed.

The observation model for the red team is relatively simple. If a blue team resource 10 is within the field of view of a red team resource 22 that has observation capability (e.g., radar), then the red team resource 22 will be considered to be aware of the location of the blue team resource 10. As long as the resource 10 is within the field of view of any observation capability of a resource 22, then the red team's localization error of the blue team resource 10 will decrease with every red team observation cycle (e.g., radar ping).

3(A)(iv). Localization and Jamming Models

For the blue team, there are two ways to reduce localization error of targets 22 from the red team, including passive geolocation and active geolocation. All newly discovered targets 22 located in a particular location are assigned a default localization error value, $\sigma_i$. When passive geolocation is performed (e.g., by using a series of radar pings) or when active geolocation is performed on the target 22, the localization error value of the target 22 will be updated in accordance with equation 4.

$$\frac{1}{\sigma_{t+1}} = \frac{1}{\sigma_t} + \frac{\gamma^i}{\sigma_d} \qquad \text{Eq. 4}$$

In equation 4, $\sigma_t$ is the localization error for the target at time t, $\sigma_d$ is a localization constant inherent to the sensor, and $\sigma_{t+1}$ is the localization error for the target 22 at time t+1. $\gamma$ is a jamming constant that detracts from the ability of the resource 10 to localize the target 10. The lower the value of $\gamma$, the more deleterious the jamming effect. The number of jammers within a predetermined radius of the resource 10 is i in equation 4. The jamming constant is one (1) when the localization update rule is applied while jamming is not in effect. The localization constants for blue team resources 10 and red team resources 22 may be different. Furthermore, the localization constants for passive geolocation and active geolocation also may be different. The localization constant for active geolocation is typically smaller.

Passive geolocation may only be used after a target has been discovered in the discovery mode. Every red team target 22 that has been discovered and is within a field of view of a blue team resource 10 will have its localization error reduced by the model described in equation 4.

In one embodiment, active geolocation involves coordinated use of at least three blue team resources that are within sensing (e.g., radar) range of the red team target 22 (e.g., a radar emitter of the red team target 22). Upon receipt of a radar ping from the emitter of the red team target 22 (or some other observation of the red team target 22), the update rule in equation 4 is applied to reduce the localization error of the red team target 22.

3(A)(v). Destruction Models

When the localization error of a target 22 falls below a specified threshold, it may be destroyed (or "killed"). In one embodiment, a blue team resource 10 that performs a kill action on a red team target 22 may be considered to have destroyed both itself as well as its target 22 by consumption of the weapon capability of the resource 10. In contrast, a red team target 22 may attempt to destroy a blue team resource 10, such as by firing a surface to air missile (SAM) at the blue team resource 10.

3(A)(vi). Decoy Model

A relatively simple decoy model may be used. For example, the frequency of radar pings from a red team resource 22 may be doubled when at least one blue team resource 10 with decoy capability is present. Otherwise, a default frequency of red team resource 22 radar pings is used.

3(A)(vii). Red Force (Enemy) Model

For purposes of data collection and simulating a planning and action loop, enemy behavior may be modeled with a rule-based planner. Under an exemplary model for the red team, interaction of the blue team and the red team may proceed as follows. A blue team resource 10 may enter the field of view (FOV) of a red team resource 22. The red team resource 22 may detect the blue team resource 10 and assign a default initial localization error. If the blue team resource leaves the field of view of the red team resource 22 before a kill threshold is reached (e.g., measured by a consecutive number of radar pings), then the interaction may end. But if the blue team resource 10 remains in the field of view and the kill threshold is reached, then the red team radar may hand off operation to a red team weapon (e.g., a SAM). At that point, the weapon is fired and the blue team resource 10 may be considered destroyed.

In this model, and unlike the blue team model, the red team does not have a discovery task that precedes the task of localization and killing. For purposes of modeling, a tunable parameter may be incorporated to govern the aggressiveness of the red force. For example, the red time aggressiveness may be described in accordance with equation 5.

$$\text{Aggression} \propto \left(FOV, \frac{1}{\text{Kill Threshold}}\right) \quad \text{Eq. 5}$$

In equation 5, FOV is the field of view of the red team resources 22 (e.g., radar units), and the kill threshold is the localization error value below which the weapon of the red team is able to target and destroy the blue team resource 10 that is within the field of view.

3(A)(viii). Performance Measure

The performance of the system may be measured in three ways. First, performance measurement may be made by the number of surviving blue team resources 10 over time, which may distinguish performance of the system from planning algorithms that preserve the blue team resource 10 regardless of whether red team resources 22 are disabled by the blue team resources 10. Second, performance measurement may be made by the number of surviving red team resources 22, which may distinguish performance of the system from benchmark algorithms whose sole concern is to disable the red team resources 22 without regard to loss of blue team resources. Third, performance measurement may be made by the net difference of blue team resources 10 and red team resources 22 over time, which illustrates the relative balance of forces. Under the above-described model, using the third performance measurement may be desirable because the only way to destroy a red team resource 22 is to expend a blue team resource 10. The third performance measurement accounts for this aspect of the model. Therefore, a system with good performance is one that maximizes the number of blue team resources 10 minus the number of red team resources over time (the third performance measure), would minimize the number of red team resources 22 over time (the second performance measure), and would attempt to achieve these results as quickly as possible.

3(B). Multi-Mode Objective Function

In this section, a single objective function is described that combines the multiple goals of search, locate and kill in a single framework. A goal is to optimize (in one embodiment maximize) the value of the objective function in order to achieve best overall system performance. The disclosed objective function has monotonic properties as the system performance improves.

The objective function is used to determine whether to change operational mode of one or more resources 10 from a current mode to a new mode. A comparison may be made between a current value for the objective function and a next possible mode's objective function value. If the next possible mode's value is better than the current value, a change in operational mode may be made. For this purpose, upper bounds for each mode are determined and combined into a single upper bound for the objective function (also referred to as a heuristic upper bound) so that the objective function may be used in the branch and bound process to trim the search space of all possible future steps in terms of mode and location for the resources 10.

The objective function may take the following form, where T is the number of alive detected targets 22 and K is the number of killed targets 22:

$$f(s) = \alpha \cdot \text{search}(s) + \beta \cdot pkill(s) + \gamma \cdot geo(s)$$

$$\text{search}(s) = 1 - \frac{1}{N^2} \sum_{i,j}^{N} P_{i,j}$$

$$pkill(s) = \frac{1}{T+K}\left(\sum_{i}^{T} pkill^*(target_i, s) + (K)\right)$$

Here, the objective function f(s) is applied to a state (e.g., search mode) s and returns a number. These functions are linear combinations of three terms: search, pkill, and active geolocation. The search term is computed over a square grid of size N×N, and each cell at location (i,j) is assigned a value $P_{i,j}$ representing the probability that there is a target in that location. The pkill term estimates the likelihood of the blue team's ability to kill red team targets 22.

3(B)(i). Objective Function—PKill Term

To compute the pkill term (target, s), a value may be determined for each pair of blue team resource 10 and red team resource 22. The value, specified by pkill(uav,target,s), may be defined in accordance with the following, where $\sigma_{thresh}$ is the localization value threshold at which a kill attempt may begin:

$$pkill(uav, \text{target}, s) = pkd(\text{distance}(uav, \text{target})) \times pk\sigma(\text{target})$$

$$pkd(d) = \begin{cases} 1 - \varepsilon & \text{if } d < lb \\ \varepsilon & \text{if } d > ub \\ (d - lb)\dfrac{-1 + 2\varepsilon}{ub - lb} + 1 - \varepsilon & \text{otherwise} \end{cases}$$

$$pk\sigma(\text{target}) = \frac{\sigma_{thresh}^2}{\sigma_{target}^2}$$

Here pkd is an estimate of the probability of killing a target 22 based on distance, pkσ is the probability of killing a target 22 attributed to the current localization error of the target 22, d is a state variable in s that specifies the distance between the resource 10 and the target 22, ε is a predetermined minimum distance, lb and ub are respectively the lower bound and upper bound quantities for which proximity will have an effect on the probability of kill, $\sigma_{thresh}$ and $\sigma_{target}$ are respectively the localization error for being able to kill the target 22 and the present localization error of the target 22.

3(B)(ii). Objective Function—Geolocation Term

The geo term factors in the desirability to perform geolocation on targets 22 to reduce their localization errors and is may be expressed as follows:

$$geo(r_1, r_2, r_3, \tau, \delta) = 1 - \tau \sqrt{\frac{(d_{1,2} - d_u)^2 + (d_{2,3} - d_u)^2 + (d_{3,1} - d_u)^2}{3}} + \delta \sqrt{\frac{r_1^2 + r_2^2 + r_3^2}{3}}$$

Figure 13:
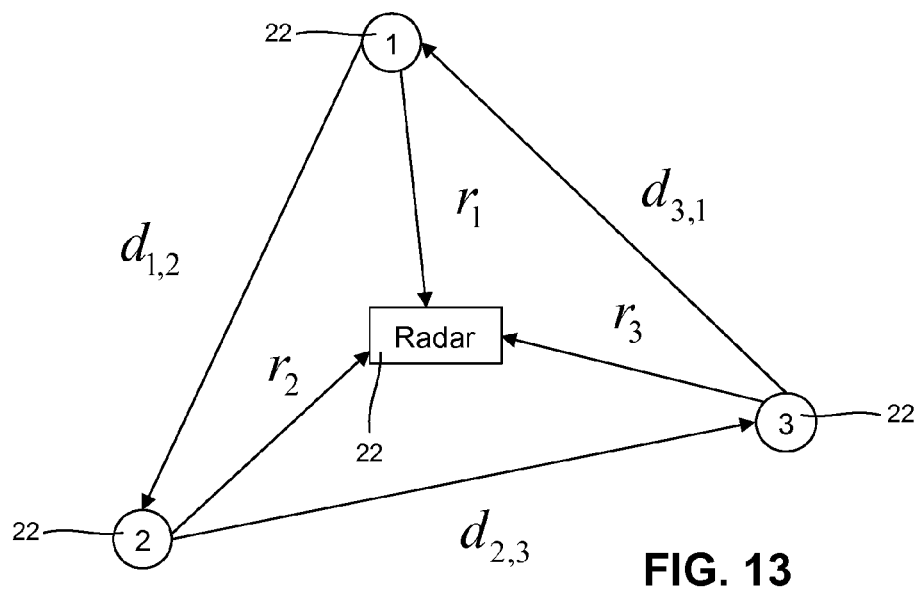
FIG. 13 is a representative formation of resources used to geolocate a target.

The two components in the above equation estimate the contribution of the geolocating resources 10 in the optimal geometry (which is an equilateral triangle for the case of three resource units) as well as proximity to the red team target 22 in question. These components are weighted by two scalars that combine by addition to 1. The distance variables d and r are illustrated in FIG. 13, which is an example of three blue team resources 10 that are engaged in actively geolocating a red team resource 22 that is in the form of a radar device at the center of a triangle formed by the blue team resources 10.

3(C). Branch and Bound Algorithm for Resource Management

Described now is an efficient branch and bound technique that optimizes the above objective function (i.e., solves the planning problem of determining the task in which to engage—searching, locating or killing). In the branch and bound approach under heading two (2), above, the branch and bound algorithm optimizes just the search term. The following branch and bound algorithm handles the multi-mode objective function set forth in section heading 3(B), above. The approaches have similarities and, therefore, similar portions of the approaches will not be repeated for the sake of brevity. The above-described branch and bound approach is split into a multi-tiered approach that efficiently reduces the size of the search space in the local and global domains to provide deterministic solution for the search operation. This same branch and bound approach is now extended for use in the multi-mode scenario.

A fundamental difference in the approaches is that when used to solve the multi-mode objective function, the upper bound heuristics for the new terms relating to passive geolocation, active geolocation and kill mode are determined. In this manner, the branch and bound algorithm results in a determination of the mode of operation for each resource 10 (e.g., search, locate, or kill) and a future destination for each resource 10.

A summary of the branch and bound operation is as follows. As described in greater detail above, the branch and bound operation starts with a basic branch and bound tier. The initial state of the system is represented by a root node. The state of the system includes the probability map of the AOI and current positions of all resources 10. This root node is used to generate a number of successor nodes, each of which represents the state of the system after executing a certain resource 10 action combination. Successors are then generated for each successor node, and this continues until the tree reaches the search depth d. A path from the root node to each leaf node is known as a branch. Branches of the joint action space are pruned by eliminating action combinations that cannot beat the current best in even the most ideal circumstances. These ideal circumstances are quantified via a heuristic, which is a routine that calculates an absolute maximum amount of gain given a state and remaining look-ahead depth. A good heuristic will use far fewer computational resources than the problem it is attempting to estimate while returning a value that is close to the value one would obtain by doing an exhaustive search. Pruning efficiently is largely dependent on the selection of a "tight" heuristic.

The next tier, which is the progressive lower bound branch and bound (PLB3) tier, further improves the pruning efficiency of the basic branch and bound tier using progressive lower bound heuristics. Since the resource 10 management operations run at each time-step, the value of the best chain of actions determined in the previous time-step may be used to set a lower bound for the current time-step. To do this, the value of the first action is subtracted from the total value of the chain of actions, and the value of a greedy action taken at the end of the chain of actions is added to that difference. This "seeds" the branch and bound algorithm with a lower bound value greater than zero, which allows for earlier pruning.

The next tier, which is the hybrid local-global branch and bound (HLGBB) tier, adds the global look-ahead information. As described above, this approach mosaics the environment into a lower resolution grid that enables the branch and bound algorithm to cover the entire AOI 14 with a smaller look-ahead depth.

3(D). Upper Bound Heuristics

The branch and bound description of section 3(C) treated the heuristic and objective function as a "black box." The objective function evaluates a node at the leaf of a tree, and is not guaranteed to have any monotonic properties. The objective function may be used independent of the search algorithm. In the context of branch and bound, an upper bound heuristic is used for a correct pruning rule. Pruning occurs when the upper bound evaluation of an interior node of the search tree is inferior to the objective function evaluation of the best leaf node that the search algorithm has found so far. For the local branch and bound algorithm, the following definitions are straightforward. For the global planner, we will substitute the midpoint of each global cell that a resource 10 is currently located in, to satisfy the input requirements of these functions.

As previously described in section 3(B), since the objective function is a linear combination of three quantities, the upper bound on the objective function may be computed by deriving upper bounds (UBs) for each of these three quantities individually and in accordance with the following where T is the number of alive detected targets 22 and K is the number of killed targets 22:

$$f_{UB}(s) = \alpha \cdot search_{UB}(s) + \beta \cdot pkill_{UB}(s) + \gamma \cdot geo_{UB}(s)$$

$$search(s) = 1 - \frac{1}{N^2} \sum_{i,j}^{N} P_{i,j}$$

$$pkill(s) = \frac{1}{T+K} \left( \sum_{i}^{T} pkill^*(target_i, s) + (K) \right)$$

3(D)(i). Upper Bound for Search Term

At the top-level of the objective function, the upper bounds for each term may be summed together. The result is an upper bound of the objective function.

Pseudocode listing 4 is a pseudocode for the generation of the upper bound of the search term.

---
Pseudocode Listing 4

Function $search_{UB}(U,T)$
  for t = 0 . . . T do
    for each u ∈ U do
      $x \leftarrow rand\left(\left\{ \mid S_i = \max_{j \in \{k \mid dist(u,k) \le t\}} s_j \right\}\right)$
      $Sx \leftarrow S_x \cdot P_{d,u}$
    done
  done
  return $\left(1 - \underset{i}{mean}\, S_i\right)$

---

The strategy of this approach is to relax the constraint that sensing actions at time t must be adjacent sensing actions at time t+1. U is the set of resource 10 locations. S is a global variable representing the sand values, and $S_i$ is the sand value at location i. T is the search time horizon. $P_{d,u}$ is the probability of detection of resource u. The term dist(i,j) is a function that gives the time it takes to move from location i to location j. The term rand(S) returns an element randomly chosen from set S.

The function iteratively increases the time bound and for each time t it would consider greedily picking the best cell within the given radius to which to apply the sensing action. The increasing radius represents the set of locations that are reachable from the initial position of the resource 10 given time t of movement. The fourth line in pseudocode listing 4 selects the cell (its location is stored in the variable x) with the highest amount of sand to apply the sensing action. The random function is invoked to break ties in case there are multiple cells with an equivalent amount of sand. The fifth line in pseudocode listing 4 applies the sensing action to that cell and updates the working memory.

3(D)(ii). Upper Bound for PKill Term

The general strategy for this upper bound is to take the tighter (e.g., smaller) of two potential upper bounds. The first potential upper bound is based on the objective function's definition of PKill, except that multiple resources are allowed to be assigned to the same target 22. The second potential upper bound is also based on the objective function's definition of PKill, except that multiple targets are allowed to be assigned to the same resource. The minimum of the two potential upper bounds will be used as the overall PKill upper bound. Therefore, the upper bound for the PKill term may be expressed as follows:

$$pkill_{UB}(s) = \min[pkilluav_{UB}(s), pkilltarget_{UB}(s)]$$

$$pkilluav_{UB}(s) = \sum_{v \in V} \max_{u \in U} [pkd_{UB}(u,v) \cdot pk\sigma_{UB}(v)]$$

$$pkilltarget_{UB}(s) = \sum_{u \in U} \max_{v \in V} [pkd_{UB}(u,v) \cdot pk\sigma_{UB}(v)]$$

U is the set of resources 10, a state variable in s, and V is the set of targets, also a state variable in s. T is the planning time horizon (a global constant), and D is the maximum distance a resource 10 travels in T (a global constant). pkilluav and pkilltarget are the two upper bounds over which a minimum is taken. In pkilluav, multiple resources 10 may be assigned to the same target 22. For each target 22, the best resource 10 to compute the product of pkd and pkσ may be selected. Similarly, in pkilltarget, the best target for each resource 10 is selected. The upper bounds on pkd and pkσ are defined as $$dist_{LB}(u,v) = \max(0, distance(u,v) - D)$$

$$dist_{UB}(u,v) = \min(1, distance(u,v) + D)$$

$$pkd_{UB}(u,v) = pkd[\max(\varepsilon, dist_{LB}(u,v))]$$

$$pklooks_{UB}(u,v) = \max[0, fov(u,v) + D - distance(u,v)]$$

$$pk\sigma_{UB}(v) = \sigma_{thresh}^2 \left[ \frac{1}{\sigma_v^2} + \frac{\max_{u \in U} pklooks_{UB}(u,v)}{\sigma_d^2} \right]$$

Defined are two distance functions representing the lower and upper bound distance between a mobile resource u and a stationary target v. $pklooks_{UB}(u,v)$ is an upper bound on the number of looks target v receives from resource u within time T, fov(u) is the field of view of the resource u, $\sigma_v$ is the localization error of target v, $\sigma_d$ is the resource's detection error, and $\sigma_{thresh}$ is the target 22 kill threshold. It may be noted that pkσ assumes that as soon as the resource 10 could be in range of the target 22, the resource 10 will be passively geolocating this target 22 from now until the kill threshold is reached.

3(D)(iii). Upper Bound for Active Geolocation

The upper bound for the active geolocation term may be the weighted sum of the upper bound on a geometric term and the upper bound on a distance term, where:

$$geo_{UB}(U,v) = \tau geotri_{UB}(U,v) + \delta geodist_{UB}(U,v)$$

$$geodist_{UB}(U,v) = 1 - \sqrt{\frac{1}{|U|} \sum_{u \in U} dist_{lb}(u,v)^2}$$

In the equations just above, U is the set of blue team resources 10, v is the red team target 22 (e.g., radar emitter), and each $u_i$ is an individual blue team resource 10. The geodist$_{UB}$ function determines the complement over [0, 1] of the root mean square error (RMSE) of the lower bound pairwise distances between all of the resources 10 and their corresponding targets 22.

$$dist_{2LB}(u, v) = \max[0, distance(u, v) - 2D]$$

$$dist_{2UB}(u, v) = \max[1, distance(u, v) + 2D]$$

$$I_{i,j \in U} = \{x \in \Re \mid dist2_{LB}(i, j) \le x \le dist2_{UB}(i, j)\}$$

$$arcdist(u, v, w) = \begin{cases} \text{if } I_{u,v} \cap I_{v,w} \ne \emptyset, 0 \\ \text{else } \min\begin{pmatrix} |dist2_{LB}(u, v) - dist2_{UB}(v, w)|, \\ |dist2_{LB}(v, w) - dist2_{UB}(u, v)| \end{pmatrix} \end{cases}$$

$$geotri_{UB}(u_1, u_2, u_3, v) = 1 - \sqrt{\frac{arcdist(u_1, u_2, u_3)^2 + arcdist(u_2, u_3, u_1)^2 + arcdist(u_3, u_1, u_2)^2}{3}}$$

The distance functions defined above permit both the blue team resources 10 (u) and the red team targets 22 (v) to move. The interval $I_{i,j}$ is the set of distances between two resources i and j that can be achieved within time T. The term arcdist computes a measure of how different two intervals are. If two intervals overlap, then this means that there exists some distance d that can be achieved by u and v as well as v and w. Since there is some common distance along this arc, it is possible for the geometry to achieve at least an isosceles triangle. The geometric function is the complement over [0, 1] of the RMSE of these arc distances.

3(E). Exemplary Simulation

In this section, described is an exemplary simulation for a local branch and bound framework with data collection. The exemplary simulation uses the objective function and its upper bound, along with the previously described models. The exemplary simulation does not integrate a global planner with the local planner in the most general sense, but some aspects of the two have been combined. Since the global planner treats the local planner and the heuristic evaluation function as black boxes, it should be apparent how to fully combine the two without a detailed example.

3(E)(i). Exemplary Simulation—Scenario Description

For purposes of description, the multi-mode tasking techniques are described in the context of a suppression of enemy air defense (SEAD) scenario. In this problem instance, it is assumed that there are both a red team of resources and a blue team of resources. In the exemplary scenario, the red time has three stationary units capable of radar surveillance and one stationary unit representing a SAM battery that does not have radar capability. The blue team has two classes of UAVs, including J-type UAVs and K-type UAVs. In the exemplary scenario, there are three J-type UAVs that each have search, jamming, decoy, passive geolocation, and active geolocation capabilities, and there are three K-type UAVs that have passive geolocation and kill abilities.

An example of a typical SEAD timeline is as flows. The timeline may start with the K-type UAVs and the J-type UAVs searching for targets. One or more targets may then be detected. At that point, the K-type UAVs may begin passive geolocation, and the J-type UAVs may begin passive geolocation and decoy operations. Then, radar emissions may be detected, at which point the J-type UAV may begin active geolocation and jamming operations. Next, the red team SAM battery and/or one or more radar installations may be geolocated. Then, the K-type UAVs may be paired with the SAM and radar targets and commence kill operations. Thereafter, a battle damage assessment (BDA) may take place. The BDA may include use of the blue team resources.

Figure 14A:
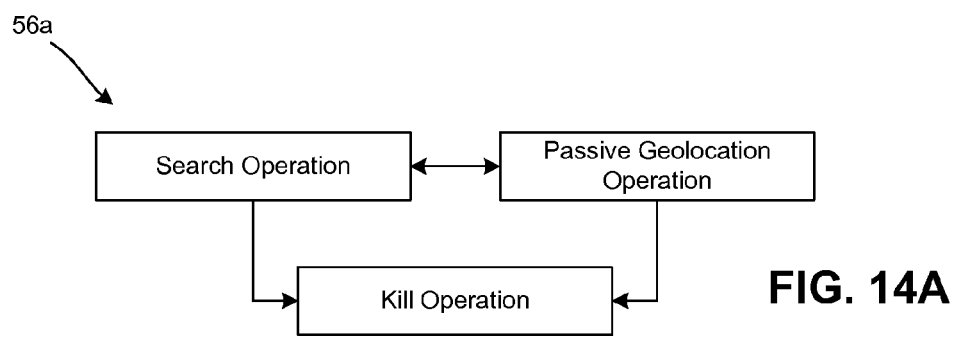
FIGS. 14A and 14B are representative state diagrams for exemplary types of autonomous resources.
Figure 14B:
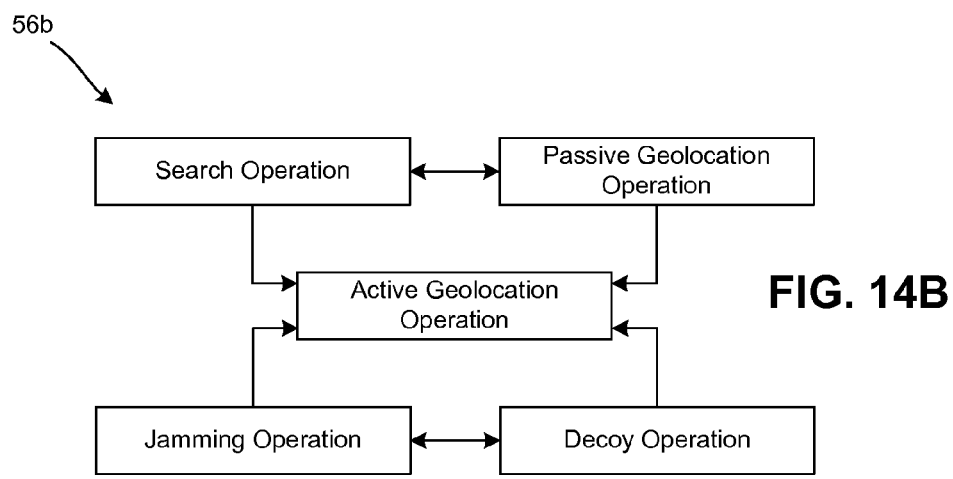

The blue team resource 10 will be driven by the objective function at each time step. Although the resources 10 are driven in that manner, the resources also may be considered to behave as finite state machines. For example, FIG. 14A illustrates a state machine representation 56a of the K-type UAVs and FIG. 14A illustrates a state machine representation 56b of the J-type UAVs.

Figure 15:
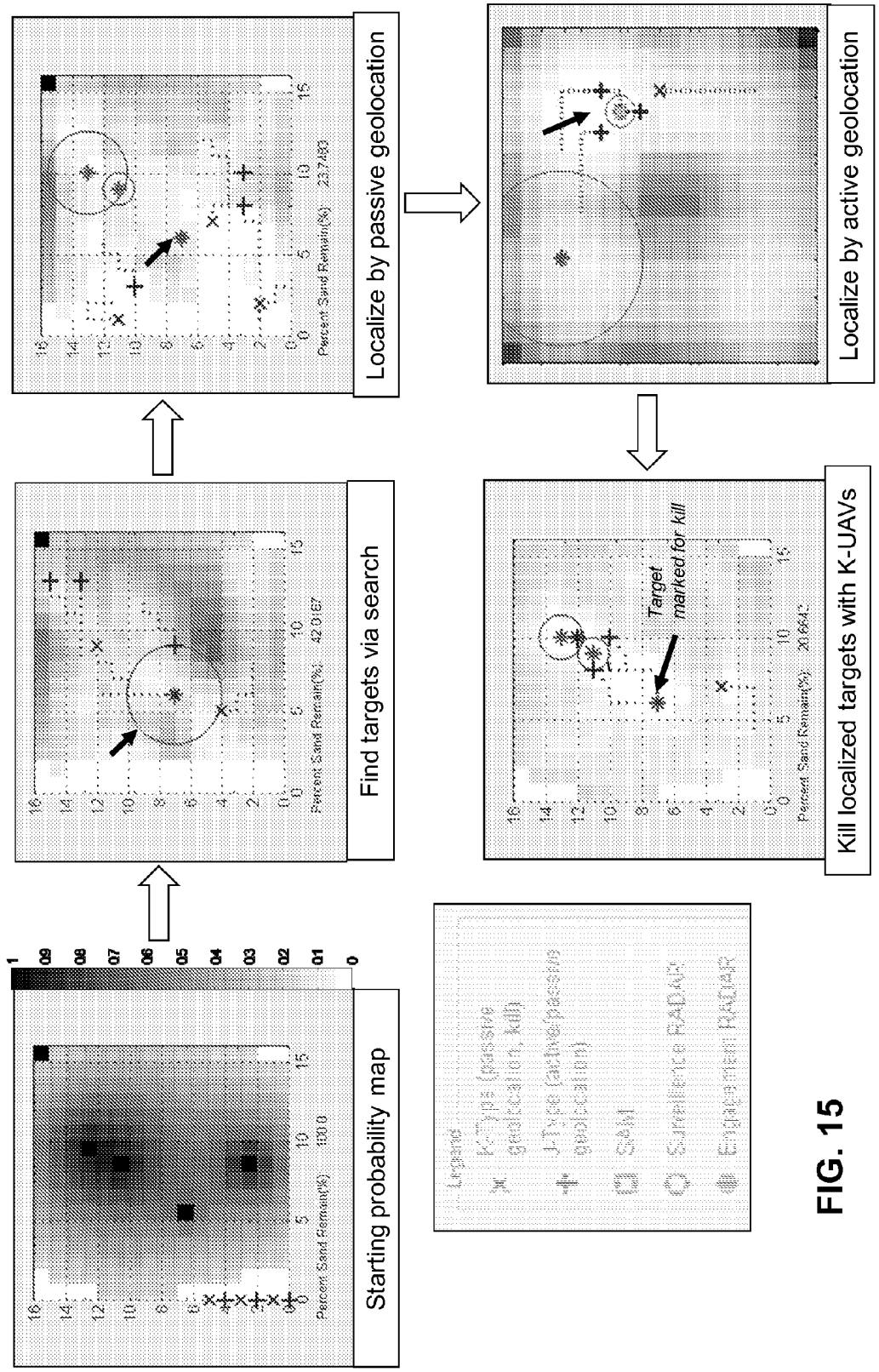
FIG. 15 is a graphic portrayal of a timeline for an exemplary simulation of suppression of enemy air defense (SEAD) and showing representative movements of resources during the SEAD operation.

FIG. 15 illustrates movement of the resources 10 for search, passive geolocation, active geolocation, and kill operations through the various stages of the SEAD timeline. In FIG. 15, the AOI 14 is sectioned into a 16×16 grid, and overlaid with the prior probability map. Dark cells represent locations for which little information is known and should be explored via the search functionality to gain more information. In this instance, there is no differentiation between the different types of red team resources 22 at this point in time. The small dots trailing a blue team resource 10 indicate the last few positions of the blue team resource 10 leading up to its current position indicated by the respective marker.

3(E)(ii). Exemplary Simulation—Search Model

The initial probability map represents the a priori belief of the likely location of targets. As the simulation progresses, this probability map is updated to reflect greater confidence of the absence or presence of an enemy resource 22 based on repeated sensing.

Figure 16:
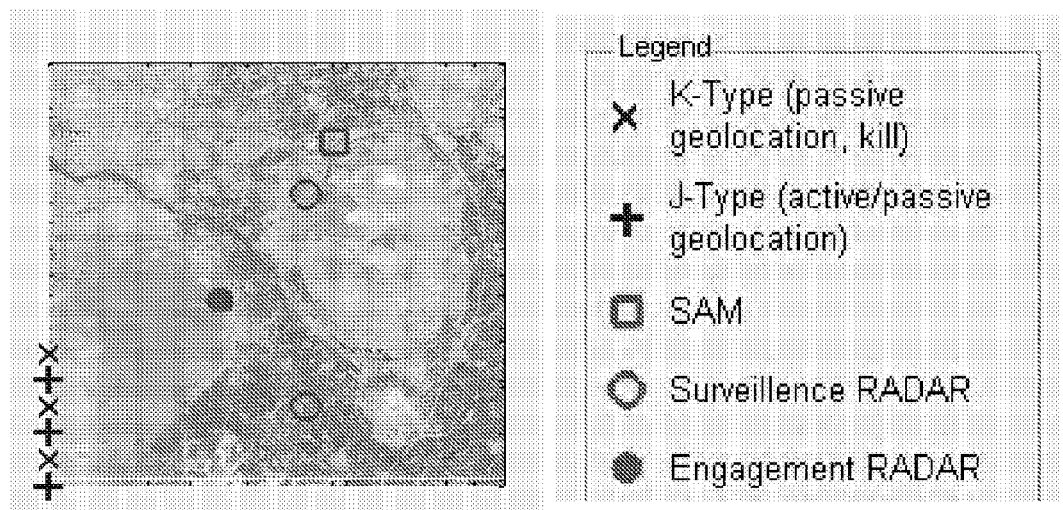
FIG. 16 shows a ground truth graphic for the SEAD simulation.
Figure 17:
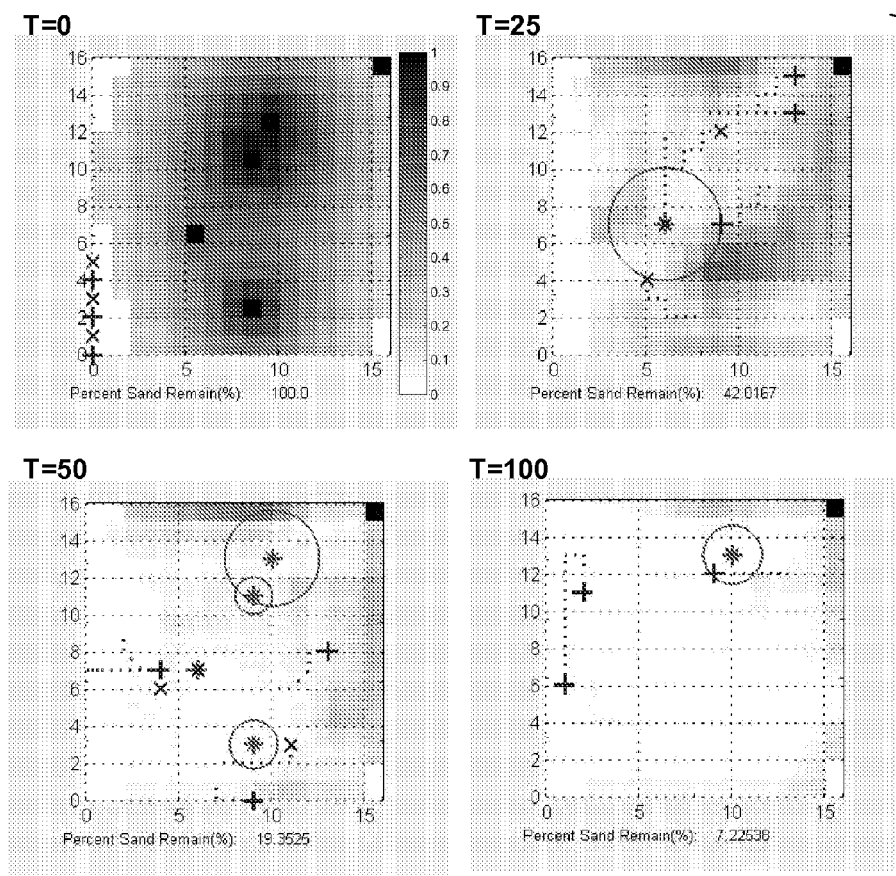
FIG. 17 shows the progression of the probability map as time progresses during the SEAD simulation.

FIG. 16 shows a ground truth graphic 58 with the true locations and classes of enemy resources 22. FIG. 17 shows the progression of the probability map as time (T) progresses and the blue team resources 10 search the AOI 14. As red team resources 22 are discovered, they are added to the map. As red team resources 22 are destroyed, they are removed from the map.

3(E)(iii). Exemplary Simulation—Passive Geolocation

Figure 18:
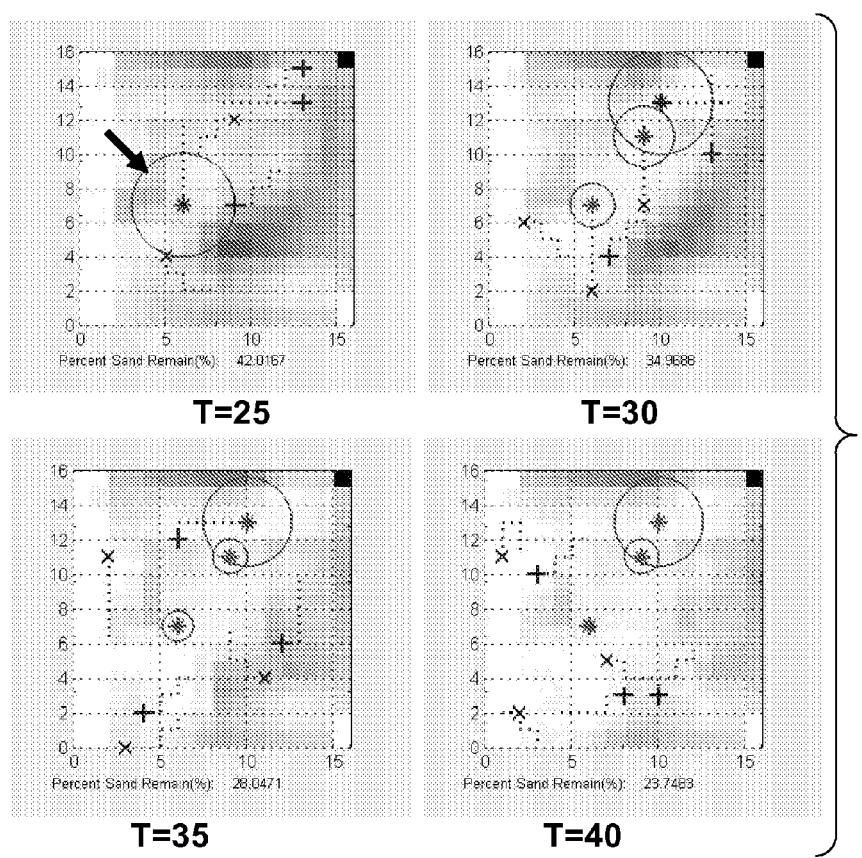
FIG. 18 shows the progression of the probability map for the SEAD simulation during passive geolocation.

As illustrated in the time progression of FIG. 18, at every simulated time step, each blue team resource 10 is able to sense within its sensor footprint once. If there is a red team resource 22 within the field of view of a blue team resource 10, then the localization error for that target 22 is reduced.

3(E)(iv). Exemplary Simulation—Active Geolocation

Figure 19:
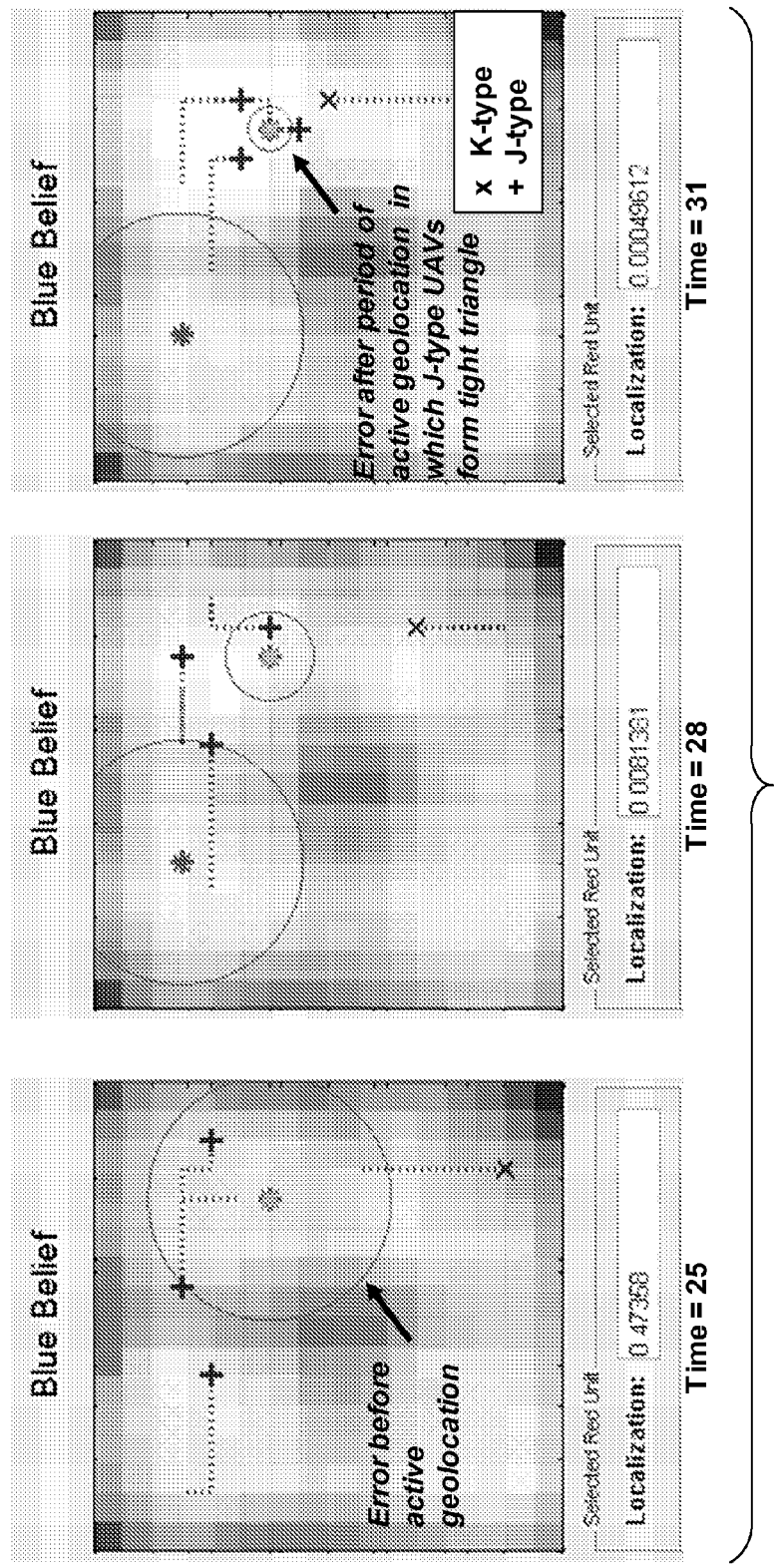
FIG. 19 shows the progression of the probability map for the SEAD simulation during active geolocation.

As illustrated in the time progression of FIG. 19, active geolocation may lead to faster location results than passive geolocation. When unlocalized targets have been discovered and there are at least three blue team resources 10 capable of active geolocation, the nearest target 22 may be selected for active geolocation. FIG. 19 illustrates the application of active geolocation to a target 33 by three J-type resources 10.

4. Conclusion

Although certain embodiments have been shown and described, it is understood that equivalents and modifications falling within the scope of the appended claims will occur to others who are skilled in the art upon the reading and understanding of this specification.

What is claimed is:

1. A method of planning resource tasking and movement where there are plural resources and plural targets and each resource has plural operational modes, comprising:
dividing an area of interest into a grid of grid cells, each grid cell having a probability that a target is present in the grid cell and each resource having a starting point corresponding to one of the grid cells;
determining, via a computer system, an upper bound for a branch and bound objective function for each of the plural operational modes of the resources;
combining, via the computer system, the upper bounds for each operational mode into a single upper bound and determining whether to change operational modes of one or more of the resources;
pruning, via the computer system, possible resource movements by carrying out a branch and bound process with the single upper bound; and
tasking each resource in accordance with the pruned possible resource movements,
wherein the operational modes for at least one resource includes a target interaction operation and wherein determining, via the computer system, the upper bound for the target interaction operation comprises:
selecting, via the computer system, a minimum of a first potential upper bound and a second potential upper bound; and
determining, via the computer system, the first potential upper bound by summing probabilities of each target being interacted with by a resource, ignoring feasibility of each resource being able to interact with more than one target.

2. The method of claim 1, wherein the upper bounds for each operational mode are combined as a weighted sum.

3. The method of claim 1, wherein the operational modes for at least one resource include a search operation and for at least one resource include a localization operation.

4. The method of claim 3, wherein the localization operation includes passive geolocation and active geolocation.

5. The method of claim 4, wherein passive geolocation starts upon detection of a target.

6. The method of claim 5, wherein active geolocation starts when localization error falls below a first threshold.

7. The method of claim 6, wherein the target interaction operation starts when localization error falls below a second threshold.

8. The method of claim 1, wherein the resources are autonomous mobile vehicles.

9. The method of claim 8, wherein the resources are unmanned aerial vehicles.

10. The method of claim 1, wherein operational mode capabilities for a first one of the resources and a second one of the resources are not the same.

11. The method of claim 1, further comprising:
determining the second potential upper bound by summing probabilities of each resource interacting with the target that each resource has the highest probability of being able to interact with, ignoring the feasibility of each target being interacted with more than once.

12. The method of claim 11 further comprising:
determining, via the computer system, the probabilities of each resource interacting with the target and the probabilities of each target being interacted with by a resource based on distance to each target and localization error of each target.

13. The method of claim 1 wherein the operational modes for at least one resource includes an active localization operation and wherein determining, via the computer system, the upper bound for the active localization operation comprises:
determining, via the computer system, a weighted sum of an upper bound of a geometric term and an upper bound of a distance term.

14. The method of claim 13 further comprising:
determining, via the computer system, the upper bound of the distance term by determining a complement over [0,1] of the root mean square of a lower bound pairwise distance between each resource and a target.

15. The method of claim 13 further comprising:
determining, via the computer system, the upper bound of the geometric term by determining a complement over [0,1] of the root mean square of arc distances, wherein the arc distances are respective measures of how different two sets of distances are, wherein each set of distances are the distances between two resources that can be achieved within a predetermined time.

16. The method of claim 13, wherein the operational modes for at least one resource include a search operation and for at least one resource include a task execution operation.

17. A method of planning resource tasking and movement where there are plural resources and plural targets and each resource has plural operational modes, comprising:
dividing an area of interest into a grid of grid cells, each grid cell having a probability that a target is present in the grid cell and each resource having a starting point corresponding to one of the grid cells;
determining, via a computer system, an upper bound for a branch and bound objective function for each of the plural operational modes of the resources;
combining, via the computer system, the upper bounds for each operational mode into a single upper bound and determining whether to change operational modes of one or more of the resources;
pruning, via the computer system, possible resource movements by carrying out a branch and bound process with the single upper bound; and
tasking each resource in accordance with the pruned possible resource movements,
wherein the operational modes for at least one resource includes a search operation and wherein determining, via the computer system, the upper bound for the search operation comprises:
iteratively searching the grid cells within an incrementing search distance for a predetermined number of steps of a look ahead depth for the highest probability, the search distance for the resource in each iteration is measured from a starting point of the resource, thereby ignoring feasibility of moves from iteration to iteration, and
summing the highest probability from each iteration.

18. The method of claim 17, wherein the upper bounds for each operational mode are combined as a weighted sum.

19. The method of claim 17, wherein the operational modes for at least one resource include a task execution operation and for at least one resource include a localization operation.

20. The method of claim 17, wherein:
the dividing of the area of interest includes:
dividing the area of interest into a coarse grid of coarse grid cells;

dividing the area of interest into a fine grid of fine grid cells overlapping the coarse grid of coarse grid cells, the area of each fine grid cell being smaller than the area of each coarse grid cell; and the pruning of possible resource movements is carried out using a progressive lower bound branch and bound function that includes:

determining a gross movement path through the coarse grid cells by carrying out via the computer system a global branch and bound function using a global search depth on the coarse grid; and determining an exact movement path through the fine grid cells by carrying out via the computer system a local branch and bound function using a local search depth on the fine grid, wherein the fine grid cells considered by the local branch and bound function are reachable within the local search depth from a path of fine grid cells through which the gross movement path traverses; and tasking the resource in accordance with the exact movement path.

\* \* \* \* \*